(12) United States Patent
Ganz

(10) Patent No.: US 11,656,584 B2
(45) Date of Patent: May 23, 2023

(54) METHOD AND MONITORING UNITS FOR SECURITY-RELEVANT GRAPHICAL USER INTERFACES

(71) Applicant: DEUTA-WERKE GmbH, Bergisch-Gladbach (DE)

(72) Inventor: Rudolf Ganz, Overath (DE)

(73) Assignee: DEUTA WERKE GMBH, Bergisch Gladbach (DE)

( * ) Notice: Subject to any disclaimer, the term of this patent is extended or adjusted under 35 U.S.C. 154(b) by 65 days.

(21) Appl. No.: 17/441,080

(22) PCT Filed: Mar. 23, 2020

(86) PCT No.: PCT/EP2020/058040
§ 371 (c)(1),
(2) Date: Sep. 20, 2021

(87) PCT Pub. No.: WO2020/188123
PCT Pub. Date: Sep. 24, 2020

(65) Prior Publication Data
US 2022/0187771 A1    Jun. 16, 2022

(30) Foreign Application Priority Data
Mar. 21, 2019   (EP) .................................... 19164202

(51) Int. Cl.
*G06F 9/451*     (2018.01)
*G06F 3/04812*   (2022.01)
(Continued)

(52) U.S. Cl.
CPC ........... *G05B 9/02* (2013.01); *G06F 3/04812* (2013.01); *G06F 3/04842* (2013.01); *G06F 3/14* (2013.01);
(Continued)

(58) Field of Classification Search
None
See application file for complete search history.

(56) References Cited

U.S. PATENT DOCUMENTS

2010/0175016 A1* 7/2010 Tian ........................ G06F 21/83
                                                            345/173

FOREIGN PATENT DOCUMENTS

DE          4332143 A1     3/1995
DE    102012203831 A1 *    9/2013    ........... G06F 3/0418
(Continued)

OTHER PUBLICATIONS

Int'l Search Report dated Jun. 8, 2020 in Int'l Application No. PCT/EP2020/058040.

*Primary Examiner* — Isaac Tuku Tecklu
(74) *Attorney, Agent, or Firm* — Panitch Schwarze Belsiario & Nadel LLP

(57) ABSTRACT

A method and monitoring unit for security-relevant input on a graphical user interface are provided. A computer generates image data that are transmitted to a display via an image data line. The user interface has at least one graphical operator control element that is selectable by an input device. A monitoring unit is connected to the image data line and reads image data for a security function. The monitoring unit is supplied with input information from the input device, and is connected to a confirmation apparatus via a secure signal path for user confirmation. The monitoring unit ensures and/or checks whether a detected selection of the operator control element is represented correctly, and, in the event of a user confirmation for a represented selection of the operator control element, enables or triggers an associated security-relevant operator control command. This allows secure input even with non-security-certifiable input devices.

20 Claims, 6 Drawing Sheets

Figure 1:
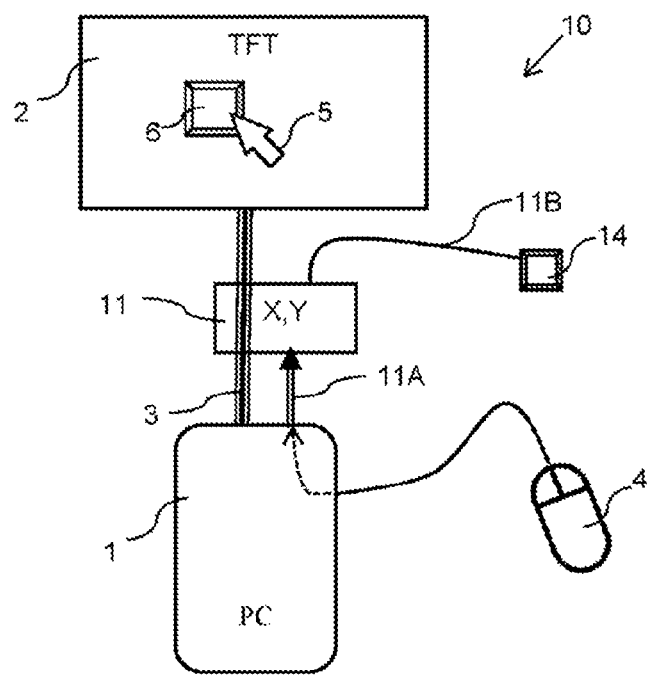

(51) Int. Cl.
  *G06F 3/04842*  (2022.01)
  *G06F 3/14*     (2006.01)
  *G06F 11/07*    (2006.01)
  *G06F 3/0354*   (2013.01)
  *G05B 9/02*     (2006.01)

(52) U.S. Cl.
  CPC .......... *G06F 9/451* (2018.02); *G06F 11/0796* (2013.01); *G06F 3/03543* (2013.01)

(56) References Cited

FOREIGN PATENT DOCUMENTS

| | | | | |
|---|---|---|---|---|
| DE | 102012203831 | A1 | 9/2013 | |
| DE | 202015104887 | U1 | 10/2016 | |
| EP | 2273369 | A1 | 1/2011 | |
| EP | 2353089 | B1 | 5/2012 | |
| EP | 2551787 | A1 * | 1/2013 | ............ B61L 15/009 |
| EP | 2551787 | B1 | 4/2014 | |
| EP | 3644145 | A1 * | 4/2020 | ......... G05B 19/4184 |
| EP | 3712770 | A1 * | 9/2020 | ............ G06F 11/004 |
| WO | 2011/003872 | A1 | 1/2011 | |

\* cited by examiner

METHOD AND MONITORING UNITS FOR SECURITY-RELEVANT GRAPHICAL USER INTERFACES

CROSS-REFERENCE TO RELATED APPLICATIONS

This application is a Section 371 of International Application No. PCT/EP2020/058040, filed Mar. 23, 2020, which was published in the German language on Sep. 24, 2020 under International Publication No. WO 2020/188123 A1, which claims priority under 35 U.S.C. § 119 to European Patent Application No. 19164202.4, filed on Mar. 21, 2019 the disclosures of all of which are incorporated herein by reference in their entireties.

The invention generally relates to graphical user interfaces (GUI) in applications for which safety, in the sense of hazard or operational safety, is crucial.

The invention relates in particular to user interfaces in which certain operations or inputs are decisive or critical for safety, e.g., in a signal box for railway technology or at a control desk or a system controller for the operation of an industrial system, a reactor, or the like. In such applications, it must be ensured that the information or input recorded as input corresponds exactly to what the operator has chosen or selected.

Even the mere presentation of information as computer graphics is prone to faults (errors). For example, faults can thus occur in each individual component of the computer generating the graphics, e.g., due to a defective microprocessor, in the graphics processor, in the individual memory modules, in the power supply, but in particular also due to software faults in the operating system, in libraries used in software production, and the application software in particular or other software components that generates or generate the GUI.

A significant improvement is offered by the technology available under the brand name IconTrust®, which is used for displaying safety-relevant information according to the concept in WO 2011/003872 A1, or the applicant's patent EP 2 353 089 B1. This technology can make the presentation safer and is, for example, suitable for safety level SIL-2 or higher. One significant advantage is that, in terms of safety technology, hardware and software of virtually any type and complexity not being assessed as safe (hereinafter referred to as "unsafe") can be used in a provably safe manner thanks to equipment using a separate, safety-certified monitoring module.

If, in addition to the pure display of safety-relevant information, safety-relevant entries are also made on the user interface (GUI), additional sources of fault can obviously arise. Sources of potential faults are basically all hardware and software components used to record and process inputs. This is particularly applicable if an inherently unsafe system comprised of commercially available hardware is intended to be equipped with a safety module according to the above approach in order to avoid a safety verification or safety certification of the overall system. The latter, however, is particularly desirable if a variety of graphical control elements or buttons in the GUI are intended to be freely usable in order to enable intuitive operation of the usual kind, e.g., using a computer mouse or touchscreen, or in order to allow subsequent changes to the GUI without renewed certification.

If modularity or current user interfaces/GUIs are desired, the problem is that both the function and display should be freely programmable in addition to the GUI being able to change dynamically or in a context-dependent manner during use. The associated safety-critical fault modes with regard to data entry or operation of the GUI are diverse and, purely by way of example, include the following cases:

a) the unsafe displaying computer wrongly associates an actuation of a graphical control element with information content other than what is correct (e.g., from a different context); b) the actuated control element was displayed incorrectly or not recorded as having been actuated (i.e., critical in the event of an emergency stop); or c) an actuation of a control element is triggered arbitrarily or accidentally without a user-controlled or user-actuated input actually taking place.

In the first aforementioned case in particular, the invention in the applicant's European patent EP 2 551 787 B1 provides a decisive improvement, especially in the case of touchscreens. The previous two cases can also be avoided using this solution concept with a certain amount of extra effort. This concept has meanwhile been successful on the market under the brand name SelectTrust® and is primarily designed for touch screens. One variant especially for HMI devices having programmable keys (so-called softkeys) is described in utility model DE 20 2015 104 887 U1.

Both solutions enable a safety-relevant input to a GUI generated by a computer that is assessed as unsafe or is not safety-certified. In this case, a user interface is shown on the display, with at least one graphical control element which can be selected in a user-controlled manner using the respective input device. A separate monitoring unit or a safety module is connected to the image data line and reads out at least portions of the image data for the desired safety function.

The solutions according to EP 2 551 787 B1 and DE 20 2015 104 887 U1 enable safe input in the sense that a user—either via touch operation or via a softkey keyboard associated with the display—i.e., absolute and direct input devices for discontinuous input, actuates an associated graphical control element, and the monitoring unit for this actuation is safely determined in accordance with coordinates associated with a predefined area within the unit or module. On the basis of these safely determined coordinates, the monitoring unit directly converts the image data regarding the predefined area into a safety-relevant command, in particular by means of coding. Therefore, the unsafe, displaying computer is not included. By virtue of the association in the unit or module, the touchkey or softkey input arrangement connected thereto, and the image data conversion or coding, it is inherently guaranteed that the activation of the command safely corresponds to what the user has actually perceived and selected on the display. In this context, the display itself can be rated as a safe device for the present purposes.

The solutions according to EP 2 551 787 B1 and according to DE 20 2015 104 887 U1 are in each case adapted to a special input device and require a safety-relevant and reliable determination of the image area coordinates regarding which the coding and/or conversion into the safety-relevant command takes place. Both are associated with a certain amount of effort and limit the hardware that can be used.

Therefore, a first object of the present invention is to provide a further development which enables a safe input on a graphical user interface using various conventional or non-safe input devices, in particular using a relative pointing device like a computer mouse, at a conventional desktop workstation with a commercially available PC as the displaying computer. In this case, the input is to be understood in terms of the user-controlled selection or actuation of a user interface control element which, at the least, can also be performed by using the non-safe input device, in particular a pointing device, e.g., a computer mouse, trackball, joystick, touchpad, touchpoint, graphics tablet, digitizer, or the like.

This object is achieved by a method according to claim 1 and by a safety module according to claim 10. The solution should in this case be at least suitable for the SIL-2 safety requirement level or safety integrity level (as per IEC 61508/IEC61511) or higher, in particular SIL-3.

A generic method or system of enables a safety-relevant or safety-aimed input on a graphical user interface (hereinafter abbreviated as GUI). In this case, a computer generates pixel-formatted image data for a display, which are transmitted from the computer to the display via an image data line. An input device in this case enables control of the GUI.

When a user interface is shown on the display—at least in one operating state or context—at least one graphical control element is displayed which is associated with a safety-relevant function. The control element is selectable in a user-controlled manner using the input device, e.g., by means of a pointer or cursor.

Furthermore, a generic monitoring unit or safety module, which is separate from the displaying computer, is connected to the image data line and reads out at least portions of the image data for a safety-aimed function. The monitoring unit is in particular independent of or separate from the displaying computer in terms of signals.

According to the first aspect of the invention and in terms of technical procedure, it is provided:

that input information, in particular image pixel-related relative or absolute coordinates, is supplied from the input device via a logical or physical signal path, or rather a first channel of the monitoring unit, according to which a control element selection can be recognized, that the monitoring unit for receiving a user-controlled confirmation with respect to the selection is connected via a safe signal path, in particular a dedicated and separate physical second channel, to a confirmation device which is designed in particular as a safe device and is preferably signal-independent of the displaying computer and/or the input device, that the monitoring unit ensures—in particular itself guaranteeing, causing, or verifying—that one or each user-controlled control element selection having a safety function is supplied to the display in image data as expected or is in fact correctly shown on the display, and that, in the case of a user-controlled confirmation received via the second channel, the monitoring unit will, within a period of time during which a reliably displayed control element selection is present, in particular in an ensured or verified manner, release or trigger the safety-relevant function associated with this control element.

In particular, said triggering can in this case take place by outputting a corresponding command, preferably via a third channel specifically provided for safe communication.

According to the invention, the selection using the input device is not yet accompanied by an actuation or control of the safety-aimed function. Instead, this function at first only displays (or makes visible to the user) a safety-aimed control element. It is only by means of a confirmation device, which is preferably connected to the monitoring module and/or is designed to be safe, that actuation or control of the control element is actually triggered, as long as the module either verifies or determines, or itself ensures, that the expected prerequisites for the module have been fulfilled. In particular, these prerequisites include an expected or correct reproduction of the selection in the image data which are supplied to the display.

The display and control concept of traditional computer workstations can in this case be retained, and any commercially available input devices can be used. In particular, according to the invention a COTS (commercial off-the-shelf) pointing device can be used. Preferably, the conventional indirect and relative pointing devices for 2D input are preferably used as input devices, in particular a computer mouse or, equally by way of example, a trackball, joystick, touchpad, digitizer, or the like.

The safety of the operation or input is, among other things, achieved by separate actuation of an additional confirmation device, e.g., a safe button connected to the monitoring unit in combination with the reliably displayed selection according to the invention. The user is thus included as an instance for confirming the actually intended input by means of the confirmation device.

Therefore, the approach proposed according to the invention can—unlike in EP 2 551 787 B1 or DE 20 2015 104 887 U1—omit the safe input and determination of input information, in particular absolute coordinates by, for example, using a touchscreen, or by direct input (using softkeys), in that the input process is essentially divided into three sub-steps, namely dividing the input process into three sub-steps, specifically:

i) the generation or determination of the input information, e.g. selection coordinates, separate from the actual actuation, ii) a display based thereupon of the selection or choice of the control element for validation or confirmation of the input according to the displayed selection by the user, and iii) a subsequent or following activation of the safety-relevant function associated with the control element dependent on a confirmation by the user by means of the additional confirmation device.

In sub-step i), for example, coordinates can be determined using a commercially available computer mouse which, as a relative pointing device, transmits a shift as a change in coordinates (DELTA coordinates) to a controller. For example, absolute coordinates can be thereby be produced based on a previous position and its change or shift. In order to implement sub-step ii), absolute coordinates can, for example, be kept in the monitoring unit, i.e., in the safer module, and can preferably be safely displayed by this module, e.g., in the form of a mouse pointer, at the absolute coordinates known by the module. Alternatively or additionally, in particular regarding positions and/or coordinates outside of predefined image areas having safety-relevant control elements, the display can also take place via the unsafe displaying computer. Within predefined image areas having safety-relevant control elements, the display should take place safely or reliably at the position corresponding to the absolute coordinates stored in the module. In sub-step iii), the user or viewer can, on this basis, recognize, validate, or confirm that the display is a valid selection position regarding safety-relevant control elements in order to trigger the desired control. This can take place in sub-step iii) by actuating a separate safe confirmation device, such as a button. The monitoring unit or the module can, on this basis, generate or output a corresponding command.

In short, a safely displayed selection is in this case separated from the actuation of the control element by means of confirmation using the confirmation device.

Thanks to the invention, the burdensome determination of input information (e.g., of absolute coordinates), which is difficult to implement using commercially available input devices, is unnecessary. Furthermore, it is irrelevant via which channel (e.g., even an non-safe channel) the input information of the monitoring unit is transmitted. The unsafe input device can, for example, also be connected to the unsafe computer. The input information can, for example, be transmitted to the monitoring unit via the image data line, optionally together with the image data in, for example, a pixel data container according to EP 2 353 089 B1.

The type and generation of the input information is fundamentally irrelevant via the proposed solution, so any input devices, in particular indirect and/or relative COTS pointing devices, can be used.

Preferably, in contrast to the teachings in EP 2 551 787 B1 and DE 20 2015 104 887 U1, a pointing device in particular is used which is suitable for relative and continuous input, in particular an indirect pointing device for 2D input. A commercially available or COTS peripheral device, in particular a computer mouse, can be used in this case. Such devices enable intuitive pointer or cursor guidance in the GUI. Accordingly, the relative movement recorded by the pointing device is translated, in particular translated into a pointer movement or into image coordinates relative to the resolution of the display.

The input information according to the input device, in particular the pointing device, can be supplied to the monitoring unit via any interface. Transmission to the monitoring unit can in particular be performed directly by the input device:

if the input device is connected to the monitoring unit, in particular a controller component of the monitoring unit, or indirectly by the computer, e.g., a desktop PC with a connected computer mouse.

The selection or display can, for example, take place using a mouse pointer superimposed by means of the monitoring unit or some other kind of visual indication, for example by a colored frame or by changing the color of the selected control element through the monitoring unit or the module.

The monitoring unit can record a subsequent input validation or confirmation by the user regarding the safety-critical control element, e.g., visually highlighted by the monitoring unit, for the purpose of outputting a control command depending on the safety-critical control element or the intended use thereof in the GUI.

In a preferred embodiment, the monitoring unit itself ensures that a recognized control element selection is correctly represented in the image data supplied to the display. This can be achieved by the monitoring unit modifying at least a portion of the image data which are intended for display in a predetermined image area associated with the control element, and the monitoring unit correspondingly forwards modified image data to the display. This modification can, for example, include a pointer display by the monitoring unit, or the image data modified by the monitoring unit can represent a pointer depending on the position of the input information currently being supplied to the monitoring unit. Additionally or alternatively, the modification can cause a visual highlighting or a visual indication of the selection for the user, in particular in a predetermined image area associated with the respective control element on the display.

The image data can in particular be digital image data for a pixel-formatted representation.

In particular, it can be provided that image data modified by the monitoring unit only superimpose computer-generated image data in certain areas, in particular in a comparatively smaller image area in relation to the entire graphical user interface, i.e., the GUI display is at least predominantly generated by the displaying computer.

As an alternative to ensuring the correct display selection by changing the image using the monitoring unit itself, it can be provided that image data generated by the displaying computer represent a control element selection. In this case, it is in particular provided that the monitoring unit verifies that a recognized control element selection is in each case correctly represented in the image data supplied to the display. This can be achieved by the monitoring unit calculating a check code and comparing this check code with at least one prestored reference code, for image data intended for display in a predetermined image area associated with the control element. For example, a technique based on the concept in the applicant's EP 2 353 089 B1 patent is suitable for this purpose.

For the sake of easily implemented operability of the user interfaces in the displaying computer and/or straightforward recognition of the selection in the monitoring unit, it should be provided that—depending upon whether the conventional input device is connected directly to the monitoring unit or to the displaying computer—input information is transmitted from the input device to the computer via the monitoring unit, or transmitted via the computer to the monitoring unit. In a preferred embodiment, a conventional input device, in particular a computer mouse, is directly connected to the monitoring unit.

Particularly in connection with image data modification for ensuring the correct selection display by means of image modification using the monitoring unit, it is turn preferably provided that the monitoring unit comprises a first computing component which, on the input side, in particular from the displaying computer via the image data line, is supplied with the computer-generated image data, and the first computing component, depending on a safety-critical control element selection, modifies this image data in order to visually highlight the selection and the image data on the output side, including, if necessary, the image data modified accordingly and outputs it to the display. The monitoring unit can in this case furthermore comprise a second computing component which is used to verify image data from the first computing component on the output side, in particular modified image data, e.g., regarding image data coding for the purpose of comparing computer-generated codes.

In particular, it can in one embodiment be provided that the first computing component calculates a first-level check code regarding computer-generated input or input image data on the input side intended for display in the predetermined image area, and the monitoring unit compares this first-level check code with at least one prestored reference code for the predetermined image area, in which case the first computer component, in a first step on the input side, preferably calculates check codes regarding computer-generated image data and, in a second step, subsequently modifies image data.

In an embodiment which is effective in terms of hardware and computing effort (e.g., the display verification can be utilized in a modular manner), it can be provided that:

a, or rather the, first computing component of the monitoring unit calculates a first second-level check code regarding image data modified by the first computing component which are intended for display in the predetermined image area, a, or rather the, second computing component of the monitoring unit calculates a second second-level check code regarding image data on the output side modified by the first computing component which are intended for display in the predetermined image area, and the monitoring unit compares the second-level check codes thus generated with one another, in particular for the purpose of verifying that the selection is highlighted by the first computing component as intended.

Both computing components can in this case preferably each calculate a third check code regarding image data for the predetermined image area without a selection, which the monitoring unit compares with one another for the purpose of verifying a display of the control element before, or rather without, the highlighting in order to display the selection.

In order to reduce the computing power required, it can be provided that the computing component(s) only calculate(s) one or a plurality of the aforementioned check codes when the control element selection is recognized by the monitoring unit.

Corresponding check codes can in particular be determined regarding pixel-formatted image data for a predetermined image area associated with the control element, which, for example, completely or only partially correspond to the control element display area. Any suitable coding method, for example a CRC calculation, can be used in this case. Reference is made in this regard to the teaching in WO 2011/003872 A1 or patent EP 2 353 089 B1.

The first computing component can, for example by means of superimposition, color change or the like, modify image data for visual highlighting of the selection such that the selected control element appears in a selected second state that is visually distinguishable from a non-selected first displaying state. Doing so improves ergonomics and simplifies visual recognition of the selection for the user. However, a pure pointer display by way of a control element is at this point understood as being a displayed control element selection. However, if the current coordinates match the safety-relevant control element, a pointer can be hidden and replaced by a display of a visually recognizable selected state.

In principle, the first computing component can, in an embodiment, output modified image data in an image data stream to the display together with computer-generated image data. This can be achieved in a simple manner, e.g., by overwriting or superimposing the computer-generated image data only in certain graphics-related areas and leaving the computer-generated image data otherwise unchanged.

The monitoring unit is preferably designed as a circuit module having at least one integrated circuit. The monitoring unit can be connected to the first computing component via serial circuitry in the image data line, preferably close to the display, in particular directly at the image data input of the display.

In an embodiment particularly suitable for conventional control concepts, a pointer or cursor, in particular a mouse pointer controlled by a computer mouse, is shown on the display in order to operate the user interface. It can in this case be provided that the pointer is generated exclusively by the monitoring unit, in particular by means of image data modification in the monitoring unit, e.g., using the first computer component, on the basis of the input information supplied to the monitoring unit. In this case, the input device, preferably a relative pointing device, in particular a computer mouse, can once again preferably be connected directly at the monitoring unit. The module consequently forwards this input information to the displaying computer.

The method and device can be implemented such that the pointer or cursor in the GUI is visible to the user, in particular permanently visible, displayed, or superimposed, in order to enable a normal and continuous operation.

A relative and/or indirect pointing device which is preferably suitable for continuous pointer guidance is preferably used as the input device. COTS pointing devices can in this case be used, for example with a USB connection. However, it is not within the scope of the invention to provide a COTS pointing device, but rather a custom-made pointing device that is compatible with a conventional relative pointing device (e.g., a computer mouse), which further comprises an independent SIL-capable confirmation device, e.g., a push-button that is safe in terms of electrical signaling, as an integrated component. The confirmation device is in this case preferably connected to the monitoring unit independently of the signal connection for the pointing device via a separate and independent signal path which is designed to be logically and/or physically safe.

In a further embodiment comprising pointer operation, it can be provided that, at least outside of all predetermined image areas for safety-critical control elements, the pointer is generated by the displaying computer. In this context, it can once again be provided that, when a safety-critical control element selection in the respective associated area is recognized by the monitoring unit, no computer-generated pointer will be shown, preferably by means of image data modification in the monitoring unit. In this embodiment in particular, the input device, in particular a computer mouse, can be connected directly to the displaying computer in a conventional manner, for example via a USB port. The displaying computer accordingly forwards input information to the monitoring unit.

Regarding image data verification in particular, for example by means of check code calculation, it can be advantageous if the pointer, in particular the mouse pointer, is in each case cyclically hidden and displayed, preferably at a frequency that is not perceived as annoying by the user. For example, for each N successive image cycles for the image data, the mouse pointer can thus only be displayed for a number m<N of image cycles by the computer or the monitoring unit. Doing so offers the option of calculating check codes for image data with the pointer hidden, in particular for the control element(s). This considerably simplifies the verification of a correct display, since pointers are intended to be quite positionally variable or movable in a very fine grid within the GUI. Alternatively, the pointer display can also be fixed or clipped to a single predetermined position by means of suitable software in the control element (s) as long as the determined coordinates or the input information do not lead away from the relevant area.

Depending on the input device, the input information can in particular represent absolute coordinate information, as is typical of a touch display, or relative coordinate information, as is typical of a computer mouse. Relative coordinate information can in this case be easily converted into absolute coordinate information using computational technology.

On the device side, a monitoring unit for monitoring a graphical user interface (GUI) is also proposed, which comprises at least:

a digital image data interface used to connect to an image data line for the transmission of computer-generated image data from a computer to a display, in particular an LVDS interface, an HDMI interface, or the like, at least one computing component which implements a safety function and reads out at least portions of the image data via the image data interface, and a device interface for input information, in particular based on an input device for user-controlled graphical control element selection.

Furthermore, according to the first aspect of the invention, it is provided that: The monitoring unit comprises a physical confirmation input, to which the safe confirmation device for input confirmation or user validation can be connected, and the at least one computing component is configured to ensure and/or verify that a recognized control element selection is correctly represented in the image data supplied to the display, in particular according to one of the preceding method forms referred to.

Further according to the first aspect of the invention, the monitoring unit is, when receiving a confirmation input via the confirmation interface during a displayed control element selection, or rather in a chronologically predetermined context with a displayed control element selection, to output an associated safety-relevant control command, in particular via a safety interface.

The proposed monitoring unit preferably comprises at least one computing component that is configured for image data modification and/or calculation of check codes based on image data. The monitoring unit can comprise at least one memory for specifying predetermined image areas and/or reference codes, in particular for verification purposes.

The monitoring unit preferably comprises a controller component for an input device, which controller component is connected to the device interface used for the direct connection of an input device. For example, a computer mouse in particular can thus be connected directly to the monitoring unit. In this case in particular, the monitoring unit preferably comprises a data interface, in particular a bidirectional data interface, for transmitting input information to the external or separate displaying computer.

According to a further independent aspect of the invention, it is proposed that the monitoring unit has a two-stage or possibly two-channel computer architecture comprising:
a first computing component, or rather computer component, which is configured to receive computer-generated image data on the input side and, according to a safety function, to modify at least a portion of the image data intended for display in a predetermined image area, and to provide image data for a display on the output side, and comprising:
a second computing component, or rather computer component, which is configured to verify image data output from the first computing component by calculating a check code for image data, in particular modified image data which are intended for display in the predetermined image area.

This is regarded as an independent invention which—in particular for but not exclusively for safe inputs—enables use of the monitoring unit to generate safety-aimed superimpositions or highlights in the graphical user interface in a safe manner.

In this context, the monitoring unit according to the second aspect can in particular be set up or configured such that that it compares calculated check codes with at least one prestored reference code, in particular for the purpose of verifying highlighting by the first computing component as intended, and/or for the purpose of initiating a safety-aimed response.

This monitoring unit having a two-stage architecture particularly, but not exclusively, suitable for a method according to the first aspect described in the introductory section. It can also be advantageously used for other applications, e.g., for safely showing a status display respecting whether or not an area is being monitored, for safely showing specified monitoring areas for pure display (without an input function), and for ensuring that areas shown represented as being faulty are reliably hidden or superimposed or marked as faulty etc.

According to the second aspect in particular, the first computing component can, regarding computer-generated image data which are intended for display in a monitoring area, be configured to calculate a check code for a safety-aimed comparison with at least one prestored reference value, in particular a reference code, for the monitoring area. The first computing component can in this case first calculate check codes for computer-generated image data on the input side and, in a second step subsequent thereto, modify image data, for example to highlight safety-relevant information, or as a safety-aimed response in the event of an fault. In particular, in an embodiment according to the second aspect, it can be provided that the first and second computing components implement different coding methods, and/or are implemented by means of two separate integrated circuits, such as FPGA, ASIC, or the like, in particular of different types, i.e., in a diverse manner, in order to minimize susceptibility to systematic faults through diversification.

In an embodiment according to the second aspect in particular, the at least one computing component having a safety function, in particular the first and second computing component(s), can in each case generate computed check codes regarding selected image areas.

The computing component(s) can be connected to a voter arrangement, e.g., to one or a plurality of processors provided or configured to compare the generated check codes with prestored reference data. The voter arrangement can thereby preferably be implemented as a two-channel processor circuit (in the case of two computing components, preferably as a 2oo2 voter), with other X-out-of-Y voter concepts also being possible, depending on safety and/or availability requirements.

If a second computing component is used, it can likewise have a two-channel design with respect to image data modification, i.e., redundant with the first, but this is not mandatory. If the computing components have two channels, the second can redundantly modify at least a portion of the image data in a manner identical to the first computing component. If both of them can each calculate a corresponding first or second check code for the modified or redundantly modified image data, the check codes can, for functional safety, be compared with one another by the monitoring unit, in particular the voter arrangement. This makes it possible to ensure that the first computing component has modified the image data in the expected manner or correctly, e.g., to highlight or hide a safety-critical area.

Regardless of the first or second aspect, the monitoring unit preferably comprises a module for safety-aimed communication via a bus interface, which can thus be used as a safety interface for outputting safety-aimed control commands, e.g., for communication according to IEC 61784-3-3, the PROFIsafe protocol, or the like.

Regardless of the first or second aspect, the monitoring unit can be configured, in particular by means of configurable or programmable computing components, logic units, or computer components like FPGA and/or a microcontroller, so that it is configured for the computer-implemented performance of at least one method step according to one of the procedural embodiments explained hereinabove. In the present case, the term "computer component" is not restricted to programmable computers, e.g., von Neumann computers, but rather includes any unit capable of processing image data by means of calculation, e.g., also preconfigured FPGAs, ASICs, and the like.

The proposed monitoring unit according to the first or second aspect is particularly suitable for equipping a display device used to display pixel graphics, in particular with a TFT panel. The modular monitoring unit can be integrated into the device, for example directly at the image data input. The display can in this case comprise at least one connection for an input device connected to the device interface of the monitoring unit, as well as a connection for a safe confirmation device connected to the confirmation input of the monitoring unit.

The invention also relates to a system for a safety-relevant input to a GUI, comprising a computer and a display for pixel graphics that is connected to the computer via a graphics data line. According to the invention, in particular according to the first aspect, a monitoring unit which is physically separate from the computer is provided in this case, as described above.

According to the first aspect, the system can furthermore comprise an input device, in particular a computer mouse, for operating a user interface, which is preferably connected directly to the device interface of the monitoring unit. Furthermore, at least according to the first aspect, a separate and safe confirmation device, in particular a safety button, e.g., having an opener and closer contact, is connected to the physical confirmation input of the monitoring unit.

The foregoing method features and device features can be combined with one another and should in each case also be independently or individually regarded as being essential to the invention.

The proposed solution can, for example, be used advantageously for parameterization in safety-relevant processes or systems, e.g., process technology or automation technology, in order to enable a safe and, at the same time, user-friendly operation by means of a GUI.

The field of application of the invention is not limited to displays or desktop computer systems, but also includes so-called convertibles or small portable devices, e.g., for remote control of machines or systems. Such small devices such as tablet PCs and the like are now used, for example, to control container cranes in ports or to program industrial robots. Furthermore, the invention can also be used in the area of critical access or authorization security, in particular for systems that require authorization.

Figure 2A:
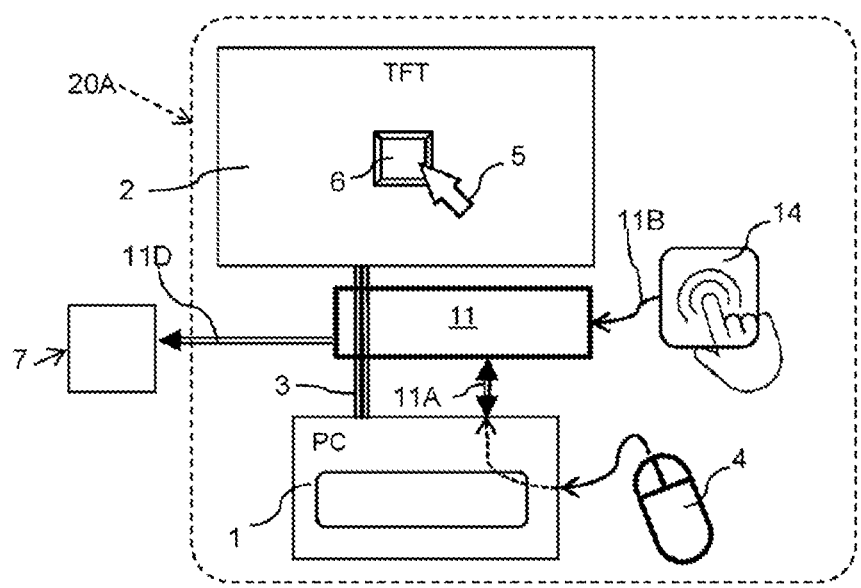
Figure 2B:
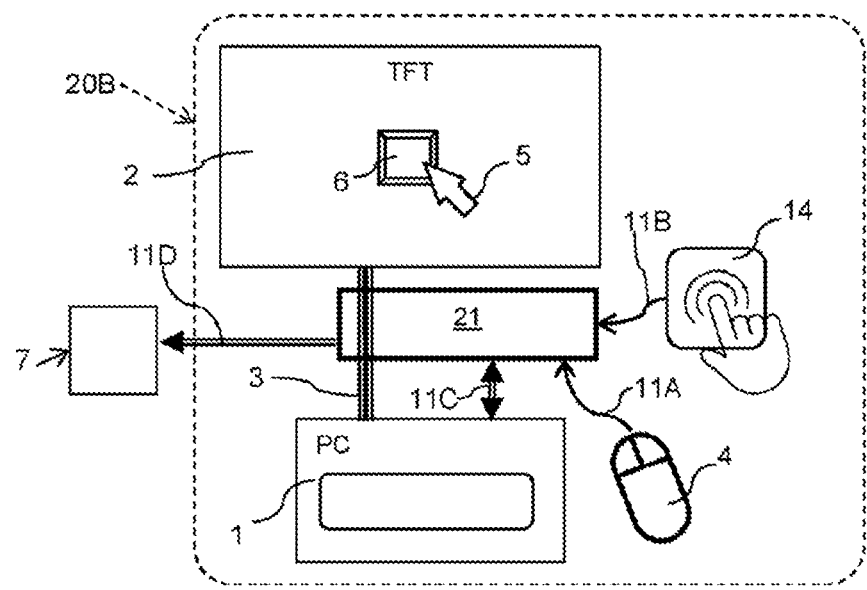
Figure 2C:
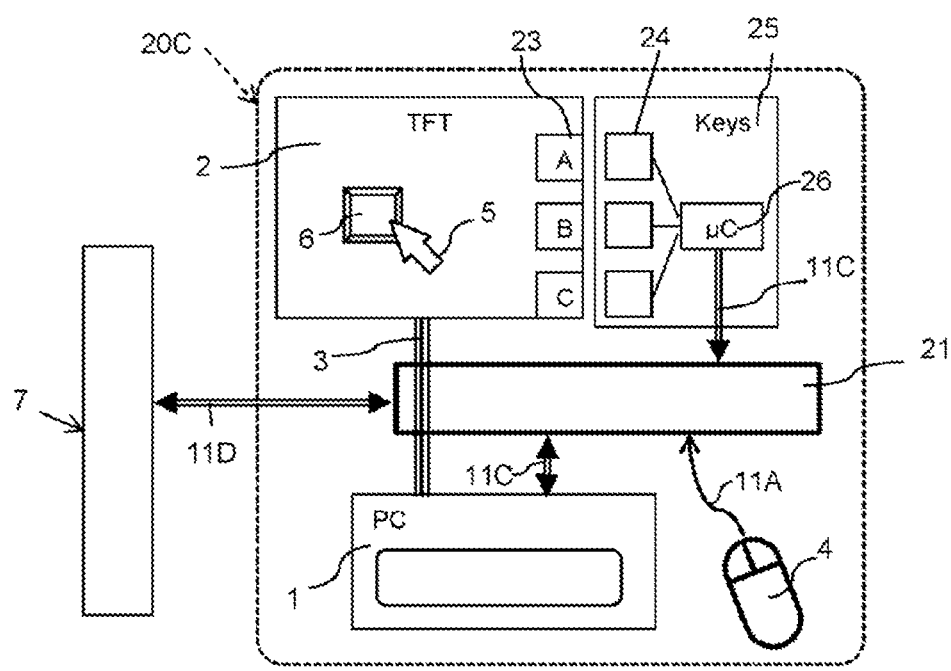
Figure 3A:
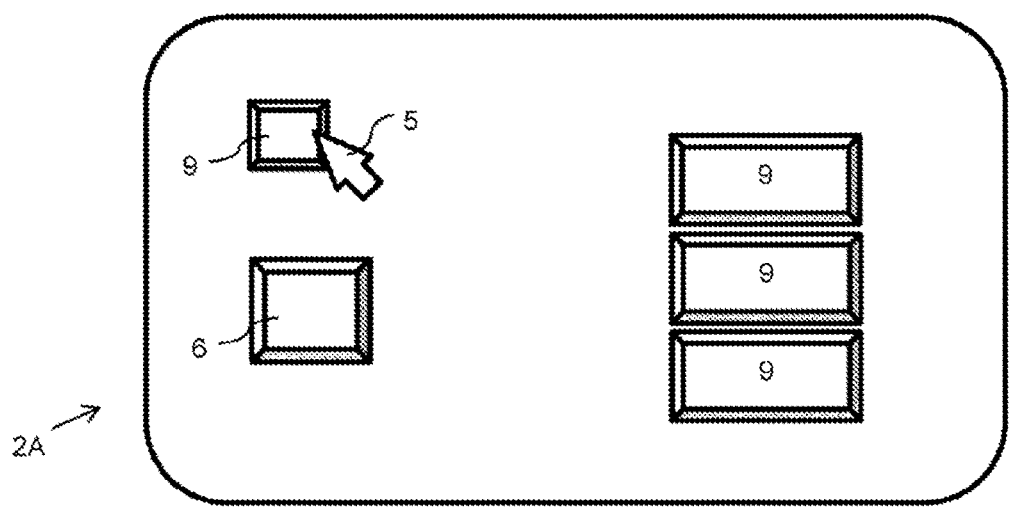
Figure 3B:
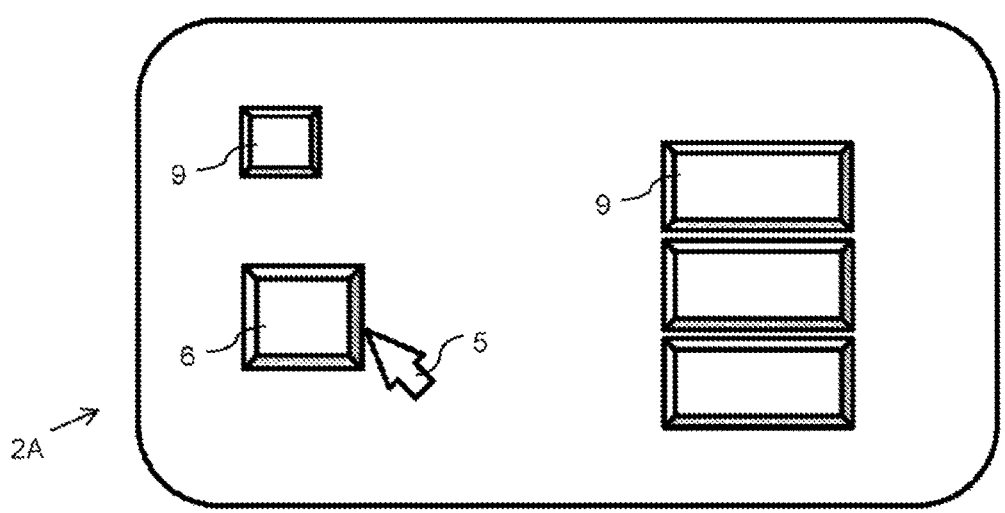
Figure 3C:
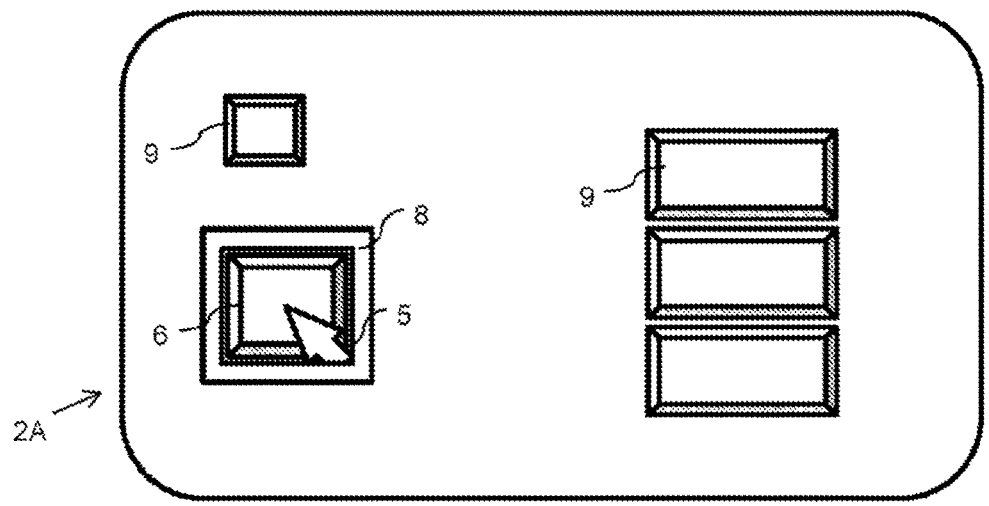
Figure 4A:
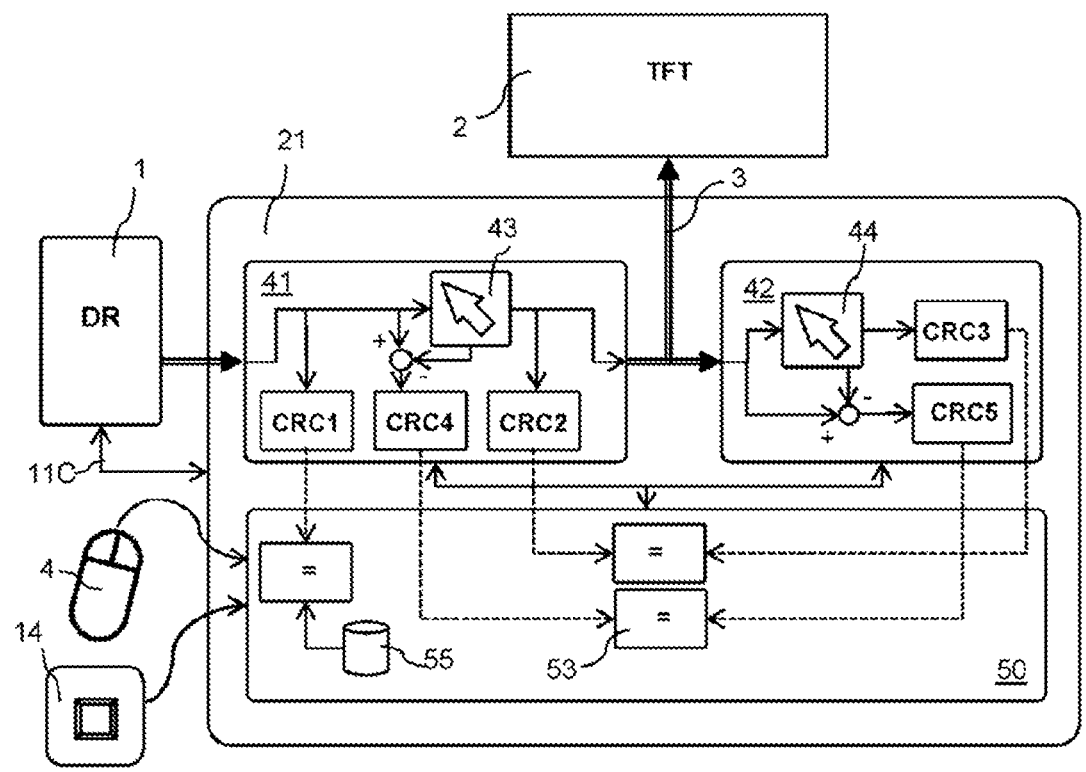
Figure 4B:
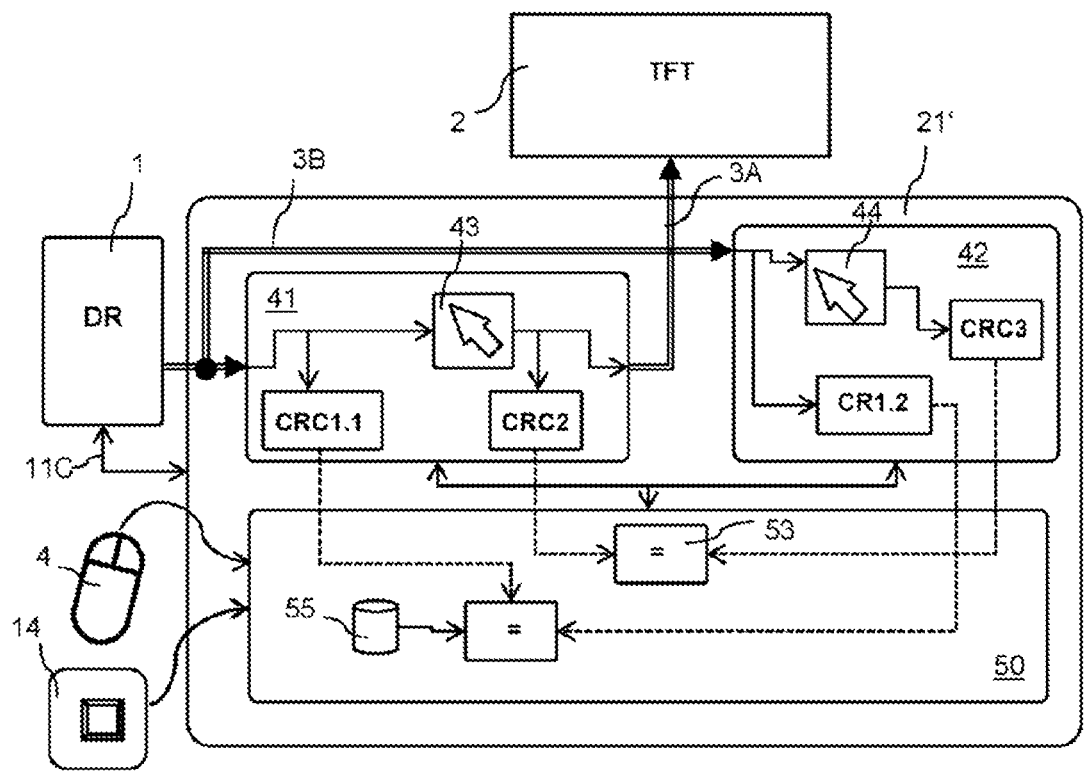
Figure 5A:
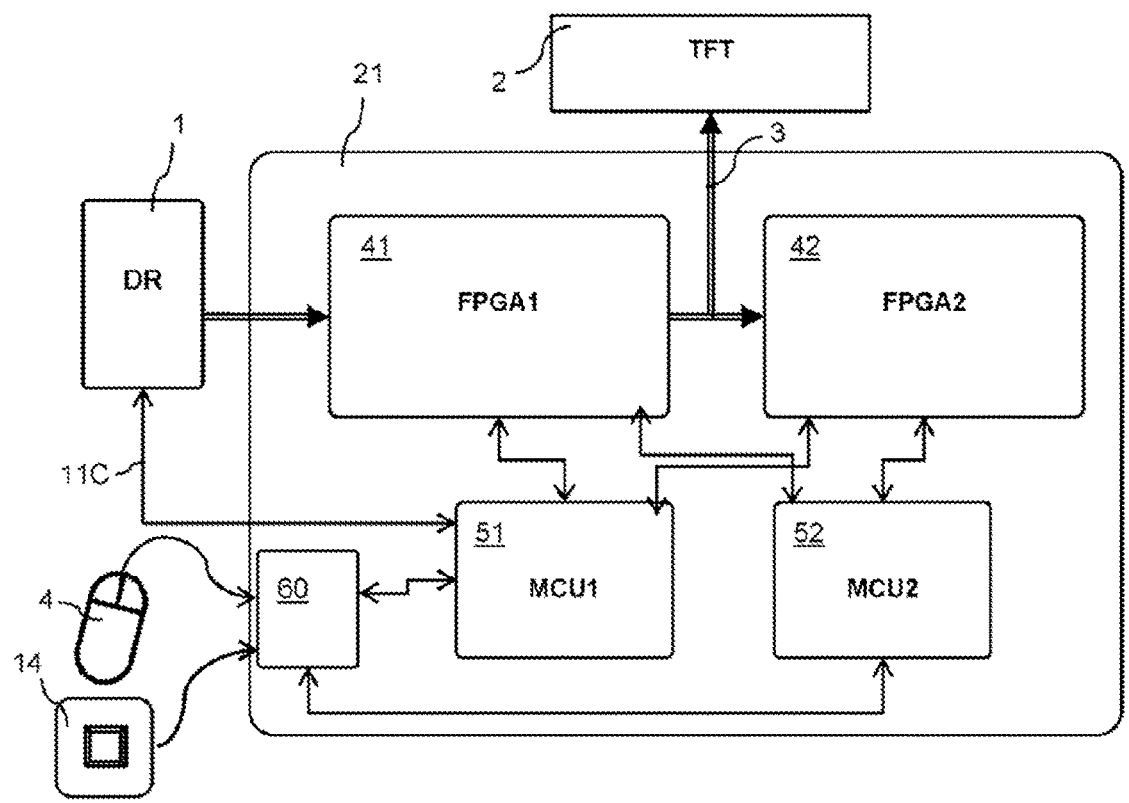
Figure 5B:
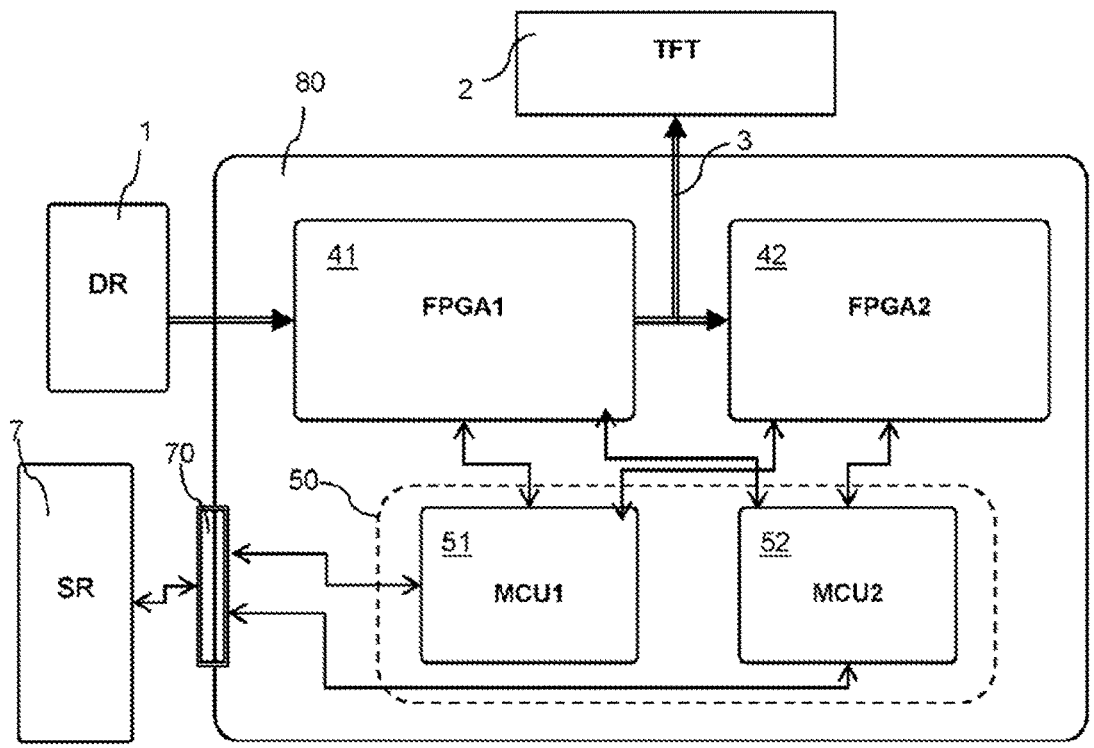

Without restricting the scope of protection, further features and advantages of the invention can be gathered from the more detailed description of preferred exemplary embodiments hereinafter with reference to the accompanying drawings. Shown herein are:

FIG. 1: a concept diagram of a system for safety-relevant user inputs on a graphical user interface (GUI) generated by an unsafe computer;

FIGS. 2A-2C: three exemplary embodiments for monitoring a GUI, with an input device connected to the displaying computer and a confirmation device connected to a monitoring unit according to the invention (FIG. 2A); comprising an input device and a confirmation device connected to a monitoring unit according to the invention (FIG. 2B); and (FIG. 2C) a variant of the confirmation device in FIG. 2B;

FIGS. 3A-3C: to illustrate a method according to the invention, various states of a purely exemplary GUI on a display comprising control elements and a mouse pointer for selecting a control element in various states: comprising a selected non-safety-relevant control element (FIG. 3A) without selection (FIG. 3B), and comprising a selected safety-relevant control element (FIG. 3C);

FIGS. 4A-4B: two exemplary embodiments of a monitoring unit with schematic signal flow diagrams to illustrate how the monitoring unit ensures that a recognized selection of a control element is correctly represented in image data;

FIGS. 5A-5B: Architectures of a monitoring unit for safe input (FIG. 5A) and/or display (FIG. 5B) in safety-critical applications according to an independent further aspect of the invention; and FIG. 6: a concept diagram of a display device comprising an integrated monitoring unit according to one of the aspects of the invention.

FIG. 1 schematically illustrates an arrangement or a system 10 for safety-relevant inputs on a graphical user interface (GUI), comprising a computer 1 which generates pixel-formatted, digital image data. The image data are supplied for display to a COTS display 2, for example a TFT computer screen, via a suitable image data line 3. Any COTS computer, for example a desktop PC, can be used as the computer 1 for displaying graphics, hereinafter abbreviated as PC 1. PC 1 is, in terms of safety requirements, regarded as being unsafe, or rather unsafe in terms of signal technology, or unsafe in terms of safety technology. PC 1 is programmable or is programmed to, among other things, display any desired GUI on the display 2, depending on the application, optionally with various context-dependent modes or screen masks (see FIGS. 3A-3C). Part of the system 10 in FIG. 1 is an input device for operating the GUI, specifically in FIG. 1 a relative, continuous, and indirect pointing device, in this case a commercially available computer mouse 4. The COTS computer mouse, abbreviated as "mouse" 4 is, by way of example in FIG. 1, connected to the PC 1 in the conventional technology. In terms of safety, the mouse 4 can also be regarded as being unsafe.

By way of the mouse 4, or some other relative, indirect, and continuous control, the user can operate graphical control elements in the usual manner by moving a position pointer or mouse pointer 5 in the GUI representation generated by the PC 1.

To achieve the desired safety level, for example SIL-3, despite the use of unsafe components, e.g., the unsafe PC 1 and a COTS input device, in this case the mouse 4, an additional modular monitoring unit 11 is provided—as shown schematically in FIG. 1. The monitoring unit 11 is provided in the form of separate hardware, or as an independent module, and is safety-certified. The modular monitoring unit 11, hereinafter abbreviated as SMU (Safety Monitoring Unit), is connected to the image data line 3 and can, for example, be connected to the image data input of the display 2. The SMU 11 is configured to read out at least portions of the image data from the image data line 3 in order to implement a safety function and to monitor predetermined image areas, in particular for the purpose of detecting faults, and/or optionally also to modify image data for the purpose of depiction on the display 2. The image data line 3 can transmit in any suitable signal format, e.g., LVDS or the like, the image data preferably being digital and pixel-formatted.

The SMUs 11 are also supplied with input information via a first signal path or channel 11A, which need not be of safe design. This information includes, based on the operation of the mouse 4 in particular, specific coordinates, either relative coordinates (FIG. 2B) or graphics-related pointer coordinates generated thereby (FIG. 2A) from a mouse pointer 5

(also "cursor"). The pointer coordinates in FIG. 1 can, for example, be determined by the PC 1 based on the relative coordinates of the mouse 4 and transmitted from the PC 1 to the SMU 11 via the first channel 11A. Depending on the input device, for example a digitizer, said device can also generate absolute coordinates and transmit them to the SMU 11 via the channel 11A.

On the basis of such input information, in particular the pointer coordinates, the SMU 11 can recognize a selection or a user-controlled selection of a safety-critical control element 6 (indicated only schematically herein). In this context, any GUI control element can be regarded as a safety-critical control element 6, the actuation of which has an application-dependent safety-relevant function in the sense of hazard or operational safety (e.g., switching of points in a railway signal box), or even access or authorization security, is associated with or is intended to trigger (e.g., a PIN entry). A safety-critical control element of this kind is abbreviated hereinafter as SEE (safety- or safety-relevant entry element).

FIG. 1 further illustrates a separate confirmation device 14, hereinafter abbreviated as CD (confirmation device), which is connected to the SMU 11 via a second signal path or channel 11B. The CD 14 is preferably designed to be separate from the mouse 4 in hardware terms. The CD 14 is preferably SIL-capable and is in any event connected to the SMU 11 via its own safe channel 11B. The CD 14 is used in the system 10 for the user-controlled confirmation of a desired operation or actuation of a safety-critical control element, schematically illustrated as SEE 6, which was previously selected using the cursor 5 controlled by the mouse 4. In this respect, actuation of buttons on the mouse 4 is ignored in SEEs 6 by means of appropriate programming, or it cannot be used to trigger a critical function associated with the SEE 6 under consideration. Instead, a corresponding triggering must be undertaken by the user by means of the CD 14, for example a safe button or push button. The user thus validates or confirms their choice or selection for one or each provided SEE 6 separately and individually by, in each case, entering or actuating the additional CD 14.

A selection of control elements, including one of optionally multiple SEE(s) 6, takes place according to user control of the cursor 5. The SMU 11 is furthermore computationally configured, e.g. programmed, such that it either itself ensures, but at least verifies, that a recognized choice or selection one of optionally multiple SEE(s) 6 (see FIGS. 3A-3C below) is correctly represented in those image data which are supplied to the display 2 via the image data line 3. It is thus ensured that a selection currently being made in the program within the SMU 11, e.g., on the basis of the pointer coordinates of the cursor 5, reliably corresponds to what is shown to the viewer or user by means of appropriate indication on the display 3. The latter can be implemented via software technology in the SMU 11.

In this case, how said indication takes place for the user, in particular whether it is generated by the PC 1 or the SMU 11, is of secondary importance as long as a user visually recognizes the selection that the SMU 11 considers or regarding as being currently valid. This indication can, in particular, already be accomplished by the fact that the cursor 5 points in a conventional manner to an SEE 6, since this is visible to the user and corresponds to the usual control. The display concept and the control concept of classic desktop workstations comprising a PC 1, a display 2, and mouse-operated cursor 5 in a GUI are thus retained.

The desired safety level, for example SIL-3, is achieved by the system 10, among other ways, in that it is not the (unsafe) displaying PC 1, but only the safe or SIL-suitable SMU 11 that, when a user-controlled confirmation is received from the CD 14 provided specifically for this purpose, triggers a safety-relevant control command or releases a safety-relevant function suitable for the selected SEE 6. A clear associated with the selection of any control element of the GUI is inherent to the pointer-based GUI having a cursor 5 (since there is always only one cursor 5). The confirmation, if present, is associated with exactly one, single selection currently considered as being safely displayed by the SMU 11, i.e., precisely associated with one SEE 6, or else it is discarded. To this end, activation of the CD 14 is in particular monitored or queried by the SMU 11 during a displayed selection of the relevant SEE 6 and used by the SMU 11 to trigger a control command associated with this SEE 6. Monitoring or querying of the CD 14 can be omitted if the SMU 11 does not recognize a valid selection of one of optionally multiple SEE(s) 6, or only takes place if a selection is recognized (fail-safe behavior). In the present case, the display 2 is regarded as being safe, since typical fault cases can be recognized by the user (fault detection). However, additional hardware measures for checking a correct display on the display 2 can also be implemented.

FIGS. 2A-2C illustrate three embodiments of systems 20A, 20B, 20C according to the invention for safe input using a relative pointing device, with an SMU 11 or 21 in the image data stream 3.

FIG. 2A illustrates a system 20A that largely corresponds to the concept in FIG. 1, specifically comprising a mouse 4 which is connected directly to the PC 1, for example to a USB port, as well as a safe button as the CD 14. The CD 14 is connected directly to the separate SMU 11 via a safe channel 11B. The relative coordinates of the mouse 4 are in this case converted in the PC 1 into image-related or absolute pointer coordinates for controlling the cursor 5 and continuously transmitted to the SMU 11 via a channel 11A, which need not be of safe design. Alternatively, absolute pointer coordinates can also be determined in the SMU 11 and sent back to the PC 1 via the channel 11A. Channel 11A is designed to be bidirectional in system 20A so that the SMU 11 can send back control commands to the PC 1, in particular regarding the representation on the display 2, e.g., with respect to hiding the cursor 5 when it points to an SEE 6, in order to further visually highlight the SEE 6 to which the cursor 5 is currently pointing (the selection), etc. If the mouse is connected to the PC 1, the latter is preferably programmed such that the SEEs 6 are not directly controllable via the PC 1 or via buttons on the mouse 4.

Furthermore, the SMU 11 is connected to a safe, external parent computer 7, for example a system controller or the like, via a safe signal path or channel 11D. When a user-controlled confirmation is received at the button 14 during a displayed SEE selection (to which the cursor 5 points), e.g., a GUI validation button for system parametrization, the SMU 11 issues a safety-relevant control command associated with the SEE 6, for example via the channel 11D, to the safe computer 7. The safe signal path or channel 11D to the safe computer 7 can be implemented by means of a suitable bus or a suitable network, for example PROFINET (see FIG. 6) or ProfiSafe, preferably having a safety view (OSI model) that is suitable for safe signal transmission.

The CD 14 can be designed to be functionally safe, e.g., using suitable controller technology in the SMU 11, and can, for example, be designed as a single-channel button 14. Purely in software terms, reliable function of the CD 14 can be ensured by means of a suitable controller. Given higher safety requirements, the CD 14 can also have a two-channel design, for example comprising an opener and closer, and/or designed to be physically safe. Above all, it must be ensured that the CD 14 does not incorrectly transmit to the SMU 11 an actuation that has not actually been performed. The absence of a performed actuation on the CD 14 will be recognized as an fault by the user.

In the system 20A according to FIG. 2A, the pointer 5, which is controlled by the mouse 4, can be continuously superimposed, for example using the displaying PC 1, and the representation on the display 2 can be monitored for accuracy by the SMU 11, for example according to the concept in WO 2011/003872 A1, i.e., by using check codes which the SMU 11 calculates for pixel-formatted monitoring areas, and by using the check codes in a comparison with, or in reference to, a value which is then compared to a reference value. For the sake of brevity, the teaching relating to the use of check codes in WO 2011/003872 A1 or EP 2 353 089 B1 is incorporated herein as a preferred solution.

FIG. 2B illustrates a preferred system 20B which differs from FIG. 2A primarily in that the mouse 4 is in this case directly connected to the SMU 21 via the channel 11A. The SMU 21 can, for example, comprise an input device controller suitable for this purpose, e.g., in an existing microcontroller or processor, or a suitable and integrated separate hardware component. The input device controller can also be implemented separately and externally, and communicate with the SMU 21 (FIG. 6) via an interface, for example I²C. In the preferred architecture in FIG. 2B, a conversion into image-related pointer coordinates of the relative coordinates which the mouse 4 generates or transmits takes place in image-related pointed coordinates within the SMU 21. The resulting image-related pointer coordinates, or also the relative mouse input coordinates and, optionally, mouse button interrupts, are then continuously transmitted to the PC 1 via the data channel 11C for the purpose of controlling the GUI, so that the PC 1, for non-safety-relevant inputs, can process the position of the pointer in order to display the GUI and, optionally, actuation of the buttons of the mouse 4. In the configuration according to FIG. 2B, the SMU 21 always has current, optionally also safe, input data from the input device, in this case the mouse 4.

In a system 20B according to FIG. 2B in particular, the pointer 5 is continuously displayed via control of the mouse 4, preferably within or by means of the SMU 21 itself. For this purpose, the SMU 21 effects a modification of the image data, which are forwarded to the display 2, for example by superimposing the graphics generated by the PC 1 in certain areas (see below regarding FIGS. 4A-4B hereinafter). In this context, the SMU 21 inherently always has knowledge of the pointer coordinates, as well as each selection of an SEE 6, in order to trigger an associated critical function when subsequently confirmed by the user via the CD 14, e.g., forwarding an associated safety-relevant control command via the channel 11D to the safe computer 7.

FIG. 2C illustrates a further variant of a system 20C, which differs primarily in the type of confirmation device (CD). In system 20C, a softkey keyboard 25, which is provided on an HMI comprising the display 2, is connected to the SMU 21 as a safe confirmation device via a safe signal path 11B. The softkey keyboard 25 corresponds to the design according to DE 20 2015 104 887 U1, which is incorporated herein for the sake of brevity.

The functional safety of the physical keys 24 is ensured by means of the softkey controller 26. Alternatively, the SMU 21 can read out the buttons 24 directly and safely. The keys 24 are typically arranged on the margin of the display 2. The PC 1 can in this case display graphical icons 23, symbols, etc., which are associated with the individual keys 24 of the softkey keyboard 25. Regarding confirmation input for a SEE 6, depending on the context, a different or always the same key 24 can be used, in which case the safety relevance or the required confirmation process can for more intuitive use be visually displayed to the user in the GUI, for example using a suitable icon 23. The accuracy of the display of such additional icons 23 relating to the confirmation process can likewise also be monitored by the SMU 21, e.g., by coding the associated image data and comparing it with an expected reference code, according to the concept in WO 2011/003872 A1.

The system 20C can also implement a separation between the pointer-based selection or selection of critical SEEs 6 and their actual actuation/control by means of a separate confirmation, in this case with one of the softkey buttons 24. The corresponding softkey button 24 is, regarding the confirmation input, associated with the selected SEE 6 in the SMU 21 in a predetermined manner. Accordingly, given actual confirmation by the user, i.e., when the predetermined key 24 is pressed, the SMU 21 can output the associated control command to the safe computer 7 via the channel 11D. In addition, if the cursor 5 is displayed exclusively by the SMU 21, the system 20C can also optionally implement further functionalities according to DE 20 2015 104 887 U1, or also according to EP 2 551 787 B1. If the positionally variable cursor is displayed by the PC 1, such a solution would, however, not be possible without considerable software effort given the requirement for unique check codes based on the image data. In this case, however, the focus is on safe operation of the GUI via the cursor 5 using a relative, continuous, and indirect input device such as the mouse 4, meaning that other functions of the softkey buttons 24 beyond confirmation input are optional.

Referring to the GUI 2A schematic in FIGS. 3A-3C, the function, or rather method, is briefly explained hereinafter.

The user moves the cursor 5 over the image depicted by the display 2, or within the GUI 2A. In this case, a number of non-safety-relevant control elements 9 are also provided, the operation of which is implemented in a completely conventional manner by means of the PC 1, optionally without involvement by the SMU 11; 21.

However, if the position of the cursor 5, which is recognizable by way of the pointer coordinates, moves into a predefined image area (monitoring area) corresponding to an SEE 6, the SMU 11; 21 will recognize a safety-relevant selection. For this purpose, the pointer coordinates (absolute coordinates) are always stored and updated in the SMU 11; 21 on the basis of indirect (FIG. 2A) or direct transmission (FIGS. 2B/2C) from the input device 4. A selection is, by way of the graphics-related image coordinates stored in the SMU 11; 21, recognized as a display area of the SEE 6, or rather a predetermined corresponding monitoring area. It is thus recognized when the cursor 5 enters this graphics area of the GUI 2A, e.g., in an input stage of the SMU 11; 21. Optionally, either by means of the PC 1 and controlled by means of the SMU 11; 21, or preferably by means of the SMU 11; 21 itself, an additional visual emphasis of this area, e.g., by a clearly recognizable frame 8 or the like, as schematically indicated in FIG. 3C, can take place.

The SMU 11; 21 has knowledge of an existing selection of the SEE 6 on the basis of the current pointer coordinates of the pointer 5. In the case of such a selection, the SMU 11; 21 verifies or ensures an accurate pointer display and, optionally, suitable visual highlighting. On this basis, the SMU 11; 21 can recognize a confirmation input, in particular a confirmation input made during the active highlighting of the selected SEE 6, via the safe button 14 or 24 as a validation by the user, and associate it with the corresponding safety-critical function of the SEE 6. Given a corresponding confirmation input on the CD 14 or 24, the SMU 11; 21 can enable the safety-critical function, e.g., output a corresponding command to the safe computer 7. This command can take any predetermined form and, for example, also correspond to coded image data for the SEE 6. Actuation of conventional mouse buttons of the mouse 4 will in this case be ignored because this is considered unsafe, and release or command output by means of the SMU 11; 21 will have no effect. The latter can be implemented more easily if the mouse 4 is directly connected to the SMU 11; 21 (FIG. 2B).

Verification of the highlighting, in particular if brought about by the unsafe PC 1, can also be achieved in this case by coding the image data of an associated monitoring area in the SMU 11; 21 and comparing it with a target code or reference code, for example according to WO 2011/003872 A1.

Visual highlighting of the selection of an SEE 6 can be accomplished by the representation by the cursor 5 alone. For the purpose of computational simplification, the cursor 5 can optionally be set and held at a predefined location via some kind of clipping or snapping if the mouse 4 is moved into the image area of an SEE 6, in particular if the cursor 5 is generated graphically by the PC 1. For example, the cursor 5 can in this case be displayed or superimposed with pointer coordinates corresponding to the geometric center of the SEE 6, with the current pointer coordinates (absolute coordinates) being able to be overwritten or ignored. In this way, the cursor 5 always receives a predefined graphical representation within the selected SEE 6 in the event of a choice or selection, so a safety-aimed graphics verification, e.g., by way of code comparison in the SMU 11; 21, can potentially be greatly simplified. In addition, operational safety is increased, or rather the user can recognize said behavior as being safety-relevant. In this variant, the usual display mode is not returned to until the cursor 5 has been moved to a sufficient degree away from the monitored image area of the SEE 6 by way of the mouse 4. In other words, the system is advantageously configured such that the cursor 5, when moved to the monitored image area of a SEE 6, behaves differently for the user than in the rest of the GUI 2A, e.g., is held at a predetermined image position or hidden.

However, highlighting the selection preferably occurs by means of the SMU 11; 21 itself, in particular by modifying the image data forwarded to the display, to which the SMU 11; 21, which is connected to the image data line 3 in an appropriate manner, has access. The SMU 11; 21 itself can, for this purpose in particular, show the cursor 5 in the image data, as a result of which the safety-aimed coding of the image data is also simplified (see FIGS. 4A-4B below).

In both cases, the SMU 11; 21 can, when selecting an SEE 6, ensure that the pointer coordinates of the displayed cursor 5 (visible to the user) correspond thereto or lie within the correspondingly monitored image area. Validation of the choice or selection (also preselection) of an SEE 6 is takes place separately from the selection and, subsequent thereto, by the user, specifically by actuating the CD 14; 24. This process is monitored by the SMU 11; 21 as a necessary condition for initiating the associated safety-relevant action, for example via a separate channel 11D for this purpose.

FIGS. 4A-4B schematically illustrate preferred implementations and architectures of SIL-suitable or SIL-capable SMUs 21, 21', e.g., for the concept according to FIG. 2B.

The illustration in FIGS. 4A-4B is partly designed as a signal flow diagram to describe a preferred manner of function. The SMUs 21, 21' are implemented as separate, modular hardware on their own circuit board or printed circuit board having an interface for connecting an image data line from PC 1 on the input side, and at least one interface for connecting a relative input device, such as the mouse 4, and for connecting the confirmation device (CD) 14, for example a safe button. On the output side, the SMUs 21, 21' have an interface for forwarding the image data via the image data line 3 to the display 2, and at least one data output or a further interface for a data channel IC, e.g., for communication with the PC 1. A common interface can optionally be used, e.g., for the mouse 4 and the data channel 11C. Furthermore, a connection to a safe computer 7 (FIG. 2B) or the like can be provided. The image data are preferably transmitted via a dedicated channel 3.

The SMU 21 in FIG. 4A-FIG. 4B has a two-stage, cascaded architecture with two at least logically separate units or computing components 41, 42 which can optionally be designed in the form of shared hardware, for example an integrated circuit. However, an embodiment with two physically separate computing components 41, 42, in particular a first FPGA 41 and a separate second FPGA 42, is preferred. The computing components or FPGA 41, 42 are in particular used for the computer processing of image data, as well as calculation of check codes. The first FPGA 41 has a input for image data from PC1 and an output for image data to the display (LVDS transmitter). The second FPGA 42 only has one input for image data, meaning that it cannot change the display.

The functioning of the FPGAs 41, 42 is controlled and supplemented by means of a processor arrangement 50 of suitable design which is connected to said input for signaling purposes, and which is connected to the two FPGAs 41, 42 for signaling purposes. The processor arrangement 50 is a component of the SMU 21 and can be designed to have one or multiple channels, for example two channels, as described hereinafter regarding FIGS. 5A-5B. The processor arrangement 50 is in this case able to implement a suitable X-out-of-Y scheme according to IEC 61508 in cooperation with the image processing computer components 41, 42, in particular with the test function of the computing components 41, 42. For example, FIG. 5B illustrates a 2oo2 scheme which, by virtue of redundant processing, first ensures no GUI function when both systems fail, hence offering increased safety and high availability. The processor arrangement 50 can, depending upon safety and/or availability requirements, thus also be configured for another voting scheme, e.g., as purely single-channel (1oo1), for redundant processing with cross-diagnosis (1oo2), as 1-of-3 voter (1oo3), or as 2-of-3 voter (2oo3), etc. For example, depending on the design, a fail-safe can be enabled, in which case, after a recognized display fault, the GUI 2A is first shifted into a safe operating mode with reduced functionality, and the GUI 2A is only switched off for a recognized dual fault, for example as in FIG. 5B. Accordingly, depending on requirements, a two-stage architecture having two at least logically separate units or computer components 41, 42 is, however, not mandatory. In particular, when the cursor 5 is being shown by the displaying computer 1, a single-stage or single-channel design having only one image-processing stage 41 for safety-aimed verification of the image data is alternatively possible.

A preferred software-implemented or computational functioning of the SMU 21 will now be explained in reference to FIG. 4A.

The processor arrangement 50 receives relative coordinates from the mouse 4, generates pointer coordinates on this basis and, by way of pointer coordinates, monitors or recognizes whether a selection of an SEE 6 is present in the GUI 2A. If this is not the case, the processor arrangement 50 communicates pointer coordinates or relative coordinates and, optionally, interrupts to mouse buttons via the data channel 11C to the PC 1. On this basis, the PC 1 controls the GUI, or the representation thereof, in image data for the display 2 in a conventional manner. Alternatively, the relative input signals of the mouse 4 can also be transmitted in parallel to the PC 1 and the SMU 21, 21'.

Furthermore, the processor arrangement 50 controls the first FPGA 41 such that said FPGA 41 generates a cursor 5 in the image data for the display, e.g., by showing or overwriting the image data according to the pointer coordinates, which the processor arrangement 50 continuously determines. It can in this case be provided that the PC 1 does not display a cursor 5 in the GUI, or the PC 1 itself only shows a cursor for non-critical areas, while only the first FPGA 41 displays the cursor 5 in critical areas of the graphics for the GUI 2A.

Optionally or in additionally, for the safety of the pure display of safety-critical information by one or both FPGAs 41, 42 for the monitoring areas of the GUI graphics to be displayed, the test method according to WO 2011/003872 A1 can be performed, for which purpose the SMU 21, e.g., parameters relating to image areas to be monitored which have a pure display function (no control elements), are supplied from, for example, the safe computer to the SMU 21.

If the processor arrangement 50 recognizes, by comparing the continuously determined pointer coordinates of the cursor 5 with predetermined or prestored image coordinates of the SEE(s) 6, or rather of a corresponding monitoring area, that a selection of an SEE 6 is present, then the FPGAs 41, 42 can be switched into a selection monitoring mode. Alternatively, the FPGAs 41, 42 can perform such monitoring continuously or continually, in particular in each case limited to the respective monitoring areas regarding the critical SEE 6 in the graphics.

Regarding the image data received on the input side from the unsafe PC 1 by the SMU 21, 21', the FPGA 41 generates a check code in a first function block CRC1 using a suitable coding algorithm, e.g., a CRC method, for those image data which correspond to an SEE 6 or agree therewith. The continuously generated code from the function block CRC1 is compared by the processor arrangement 50 with a prestored reference code or target code from a memory 55 for the one or, optionally, plurality of SEE(s) 6. On the input side, this ensures that the expected SEE 6 was correctly displayed by the PC 1 and will not be influenced by the positionally-variable display of the cursor 5. Only in the subsequent signal flow does the FPGA 41 show the cursor 5 in the image data in the function block 43 in a position according to the current pointer coordinates, e.g., by means of overwriting or superimposition. In function block CRC2, the FPGA 41 generates a further pointer-related check code for the area of the image data corresponding to the current display of the cursor 5. In an additional function block CRC4, the FPGA 41 further generates a "pointer-free" check code for a surrounding area of the image data without displaying the cursor 5, e.g., the difference between the cursor area for CRC2 and the SEE image area, or, however, the difference between the area for CRC2 and an area beyond that and up to the entire display of the GUI. In order to generate the "pointer-free" check code CRC4, check code CRC4 is calculated for those pixels representing the difference or remaining amount of pixels in the monitored image area, e.g., the entire GUI 2A (amount A) and the amount of pixels representing cursor 5 (amount B), meaning amount A without amount B, i.e., the pixels for the cursor 5 are not contained in the difference amount. Other suitable methods, i.e., in addition to CRC checksums, can also be used as algorithms for the check code.

The image data correspondingly modified by the FPGA 41 by showing the cursor 5 are output from an output of the FPGA 41 to the display 2 via the image data line 3. Furthermore, these modified image data are fed in parallel to a second logical or physical stage, in this case a second FPGA 42 which, unlike FPGA 41, is connected to image data line 3 only via one input. The second FPGA 42 again superimposes, in a manner identical to that of the first FPGA 41, the display of the cursor itself according to the current pointer coordinates of the processor arrangement 50, but these data are not output. In function block CRC3, FPGA 42 generates a further pointer-related check code for the area of the image data corresponding to the currently displayed representation of the cursor 5 by FPGA 42 in a manner similar to CRC2 in FPGA 41. In function block CRC5, FPGA 42 forms a further pointer-free check code (see above) for a surrounding area of the image data without displaying cursor 5, i.e., for the relevant pixel difference amount corresponding to CRC 4 in FPGA 41.

The check codes calculated in the program stages, or rather blocks CRC2, CRC3, CRC4, CRC5, are evaluated in a safety-aimed manner by the processor arrangement 50, in particular compared. For this purpose, the processor arrangement 50 continuously compares the pointer-related check codes, CRC2 and CRC3, with one another in a comparator or function block 53 for the purpose of fault detection, i.e., to verify and ensure that the cursor 5 has been correctly displayed by the FPGA 41. Furthermore, the processor arrangement 50 continuously compares the pointer-free check codes CRC4 and CRC5 with one another in a comparator or function block 53 for the purpose of fault detection, i.e., to verify and ensure that the showing of the cursor 5 or the modification of the image data in the FPGA 41 does not cause any undesired or unwanted changes in other screen areas of the GUI. In case one of the comparison levels shows a deviation based on CRC1, CRC2, or CRC4, the activation or release of the safety-critical function of the SEE 6 is blocked or is not permitted and, optionally, an fault is indicated to the user by means of further image data modification (e.g., by hiding the SEE 6 or the like). Only if all safety-aimed tests or comparison results are positive does the processor arrangement 50 employ a user-controlled input on the safe CD 14 that is recognized, in particular during the period of the displayed selection, as a validation of the safety-relevant action associated with the respective SME 6. The SMU 21 triggers this function or action only when the selection has been verified as correct, in this case by an output from processor arrangement 50 via a suitable interface to a safe system, e.g., the safe computer 7 or, for example, a system controller. The processor arrangement 50 generates a voter, preferably a 2oo2 voter as described above, but this is not mandatory.

The two-stage or two-channel architecture having the second FPGA 42, which is controlled and read out independently of the processor arrangement 50, in this case allows for a reliable display of all safety-relevant GUI functions, in particular also the showing of the cursor 5 by means of the first FPGA 41. In contrast to the PC 1, the monitoring module or SMU 21 is SIL-capable or SIL-suitable and can in particular be safety-certified.

The SMU 21' in FIG. 4B has a design and function as identical as possible to that described regarding FIG. 4A and differs in particular in that the two FPGAs 41, 42 are directly supplied on the input side with the image data communicated from PC 1 to SMU 21', i.e., FPGA 42 cannot be influenced by the output of FPGA 41. The safety-aimed check functions can, however, be implemented identically or equivalently. In particular, by comparing the check codes from CRC2 and CRC3, it is also ensured or verified in this case that the cursor 5 was displayed by FPGA 41 as expected. In both cases, the display and coding can in particular take place continuously and synchronously with the image data, for example for each screen refresh. In both embodiments, the coding according to levels CRC2 . . . CRC5 can then only take place as required if a selection based on the position of the cursor 5 is recognized by the processor arrangement 50 and, optionally, a correct display of SEE 6 has been determined by means of CRC1, since both are prerequisites for the subsequent validation.

As a variant of the preceding functionality, however, it can also be provided that the cursor 5 is shown by the displaying PC 1, in particular as long as the pointer position is located outside of the preconfigured graphics- or pixel-related input areas (EB) of the predetermined critical areas for SEE 6. The SMU 21; 21', for example by transmitting the pointer coordinates via channel 11C to the PC 1, at the same time reports whether the cursor 5 is located at image coordinates inside or outside the EB. Given this response, PC1 is optionally requested to hide the cursor 5 if a selection is present (pointer coordinates within an EB). If the coordinates are located within an EB, then the SMU 21; 21' itself can additionally visually highlight the relevant EB, e.g., by a color change or, optionally, by hiding the cursor 5. This mode of operation can, as explained above, also be verified in a safety-aimed manner. It is advantageous if the cursor 5 is shown, or the selection is highlighted, directly by the safe SMU 21; 21' so that image data generated by the PC 1 without the cursor 5 or highlighting can be verified more easily for accuracy, in particular respecting the correct representation of all SEE(s) or EB(s).

FIG. 5A illustrates a further preferred architecture for a monitoring module or SMU 21, for example according to FIG. 4A, having a two-channel implementation of the voter arrangement or processor arrangement 50 by means of two separate controllers or processors 51, 52. The processors 51, 52, in each case dually and independently, implement all relevant control and verification functions as described hereinabove regarding FIG. 4A in order to uncover irregular fault-related behavior with respect to greater safety requirements, and generate a 2-out-of-2-voter using the FPGAs 41, 42 as verifying encoders. For this purpose, both processors 51, 52 are each connected to two FPGAs 41, 42 for signaling purposes and verify one another mutually and independently for proper and correct function (two-channel concept). The external interface 61 for the relative pointing device, for example the mouse 4, and in particular for the safe button 4, can be implemented as a separate component or integrated into the processors 51, 52.

FIG. 5B illustrates a further, preferably continuous, two-channel architecture for a monitoring module 80. The monitoring module 80 is, regardless of the above-described function for safe input, also inherently considered to be a further development of the teaching in WO 2011/003872 A1 used for monitoring a safe representation (optionally without an input function) of input parameters and should be regarded as being essential to the invention.

The input parameters to be monitored can be supplied to the monitoring module 80 via the interface 70, for example by a safe computer 7.

The FPGA 41 generates check codes regarding one or more graphics-related, predefined monitoring areas for safety-critical displays. The check codes CRC1.1 and CRC1.2, which are each determined by one of the two FPGAs 41 or 42, are each independently compared in the two-channel implementation of processors 51, 52 with a predetermined reference value corresponding to the input parameter prestored as a reference value for the respective input parameter, e.g., during a configuration. The reference value for the comparison can be determined as a reference code based on an input parameter, for example using a lookup table, or the current input parameter is compared with a reference parameter recovered from the determined code, for example using a lookup table. With respect to further functionality, in particular the generation of check codes for monitoring areas, the teaching in WO 2011/003872 A1 is incorporated herein with regard to FIG. 5B.

The two-stage, and preferably also two-channel, hardware implementation for the FPGAs 41, 42 corresponds to FIG. 4A. In this case, the second FPGA 42 is again connected to the image data line 3 only via an input (read-only connection), i.e., it cannot modify the image data while the upstream first FPGA 41 is reading the image data (e.g., as an LVDS receiver), which the latter can optionally forward unmodified (e.g., as an LVDS transmitter).

Using the monitoring module 80 according to FIG. 5B, two functions in particular that are advantageous in terms of safety can be implemented which allow for higher safety levels, for example SIL-3 or higher.

On the one hand, safety-aimed visual fault detection by the FPGA 41 using image data modification, in particular by means of hiding or showing (e.g., switching to white), or other indications visible to the user in the image data at the output of the FPGA 41, can be verified by the second FPGA 42 in the event of faults detected using the check code method. The FPGA 42 in this case verifies, by generating a check code for the graphics fault display, the graphics fault detection expected in the event of an fault expected be generated in the image data at the output of the FPGA 41 by way of a correspondingly expected representation, e.g., using the check code method. The graphics fault display or fault detection can be verified by the FPGA 42 by the latter implementing the same functionality as the first FPGA 41 respecting modification of the image data regarding image data recognized as defective, i.e., in this case the FPGAs 41, 42 also form a two-channel arrangement for verifying and modifying image data. FPGA 42 can, however, also generate prestored codes corresponding with the expected behavior or target behavior of the image modification by the first FPGA 41 without itself redundantly repeating the image modification in FPGA 42.

By way of the check codes from the FPGAs 41, 42, a comparison is made with a corresponding target value or target code. This comparison is again performed via two channels and independently in both processors 51, 52 in order to increase safety. Doing so ensures correct fault detection, or fault detection in a manner visible to the user. The fault detection and cross-verification is preferably limited to and in each case with respect to individual predefined monitoring areas, so that the rest of the display remains unaffected. If this cross-verification of the fault detection using FPGA 42 does not yield a positive result, a safety-aimed measure, for example switching off or switching the display to an unsafe mode, can take place. As a result, the system offers greater safety, since two different methods are provided for avoiding the inaccurate display of safety-critical information. Selective fault detection for an individual monitoring area, e.g., by means of hiding, showing, or marking as faulty (erroneous) by means of the first FPGA 41, firstly increases the level of availability since the further verified safety-critical image areas, which are optionally displayed as being correct, are not affected. The second method for ensuring fail-safe operation is achieved on the basis of the second stage having the additional FPGA 42, in this case interacting with the processor arrangement 50. If the first method does not selectively reveal the fault in the monitored image area as expected, this result is revealed by way of the second FPGA 42 so that, for example, the entire display can be switched off by the voter or processor arrangement 50. A 2oo2 voter, such as the processor arrangement, is also advantageous for this purpose. Owing in particular to these two independent fault detection methods, the monitoring module 80 can guarantee safety level SIL-3 since critical dual faults can be ruled out. In addition, at least the second method in the monitoring module 80 can also be implemented with a two-channel design and/or in a diverse manner.

Additionally or alternatively, with respect to enhancing the correctness of the display areas being monitored, which the FPGA 41 performs as expected by means of image data modification, the second FPGA 42 can also perform this verification. The visual highlighting and/or indication can in this case take place in various ways, e.g., by showing a graphical frame or a graphic symbol, icon, or widget, on the basis of which the user can recognize which areas of the current depiction of the display 2 are actually being monitored by the monitoring module 80, or are being verified by the monitoring module 80 in a safety-critical manner. For this purpose, the second FPGA 42 can also generate a check code for the image data at the output of FPGA 41, e.g., for the monitoring area that includes the expected graphical highlighting, which check code is in turn compared independently and, optionally, via two channels in both processors 51, 52 having a corresponding target value or target code. Therefore, the FPGAs 41, 42 can in this case generate two different check codes for each monitored area—a first check code for the image data of the monitored area not having an indication that is being monitored, and a second check having an indication that is being monitored. Given a suitable coding algorithm, e.g., having a large Hamming distance, two-channel coding is thus simultaneously achieved in relation to the original image data generated by PC 1. Corresponding predetermined comparison data are stored in the voter and/or processor arrangement 50 for first and the second check codes (see CRC1.1 and CRC1.2), which data correspond to the working case, i.e., for the correct representation of the initial parameter by way of the first verification code and for the correct display with highlighting of the monitored area by way of the second check code. In this way, monitoring of the respective image area that is reliably recognized as active by the second FPGA 42 and the processors 51, 53 can, for example, also be output to the safe computer 7.

Furthermore, the monitoring module 80 itself can in a safe manner generate a visual display of the operating mode in which the monitoring module 80 is working, for example with active monitoring (safe) or inactive monitoring (not safe). This can also take place by means of image data modification by the first FPGA 41 and be safely cross-verified via the proposed architecture with the second FPGA 42 and the preferably two processors 51, 52. The status display by the monitoring module 80 is particularly advantageous if the GUI is intended to display various modes or various context-dependent screen masks.

By way of the monitoring module 80, essentially any type of desired change to the image data that are generated in an unsafe manner by PC 1 can be performed in a safe manner. This is achieved thanks to the ability to modify image data in a first stage, for example in the FPGA 41 and, in a second stage, for verification of the image data modification by the first stage, for example by means of the second FPGA 42. Both computing components that are used for this purpose, for example the FPGAs 41, 42 can, in particular, also implement a two-channel monitoring function for critical image data, as described above, but this is optional.

This two-stage implementation could also be realized by way of a single integrated circuit, e.g., a single FPGA, or also by way of a single processor or the like having a logical, or rather virtual, division or separation into two-stage computing components or modules. However, an actual hardware-based, two-channel implementation having two computing components, e.g., the FPGAs 41, 42 is advantageous. A diversity of component types, e.g., the FPGAs 41, 42, having a diversity of designs can in this case be used in order to minimize the risks of systematic faults, for example common core faults. The same applies to the processors 51, 52.

The likewise two-channel voter implementation of the processors 51, 52 is, for greater safety, preferably galvanically separated from the FPGAs 41, 42 by means of insulating components, so that a physically separate processor area 50 is provided on a common printed circuit board of the monitoring module 80.

A completely two-channel architecture for the monitoring module 80 having two computing components 41, 42 for image data coding which, for verification purposes, implement identical function(s) regarding image data modification for test purposes—e.g., as explained above—and two processors 51, 52 for functional control and operation, is particularly advantageous with respect to fault limitation and fault detection. Preferably, at least both processors 51, 52 each have independent, or at least reaction-free, resources like the power supply, clock, signal paths, etc.

Figure 6:
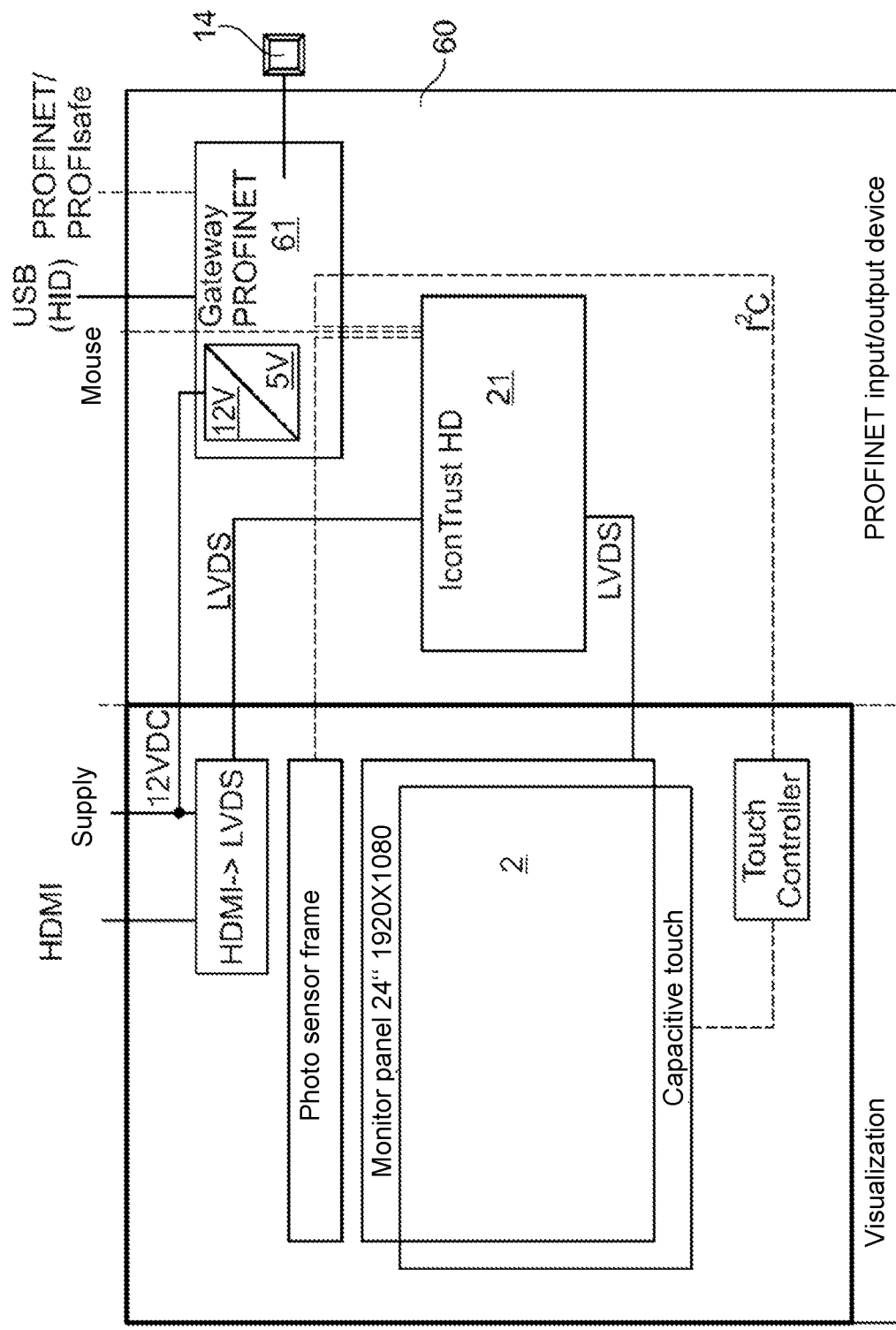

FIG. 6 schematically illustrates a safe display device 60 for displaying pixel graphics, in particular having a TFT panel, with an SMU 21 integrated into the device, for example according to FIG. 4A. Computer-generated image data, optionally after conversion from a signal format customary for PC displays, such as HDMI, to LVDS by means of an existing monitor controller, is forwarded to the SMU 21 and output from there to the TFT controller of the display device 60.

The display device 60 also has an integrated, special interface module or gateway 61, which is connected to the SMU 21 via a bidirectional data connection, so that only one connection is required for this purpose on the SMU 21, and the gateway 61 can be configured depending on the application. The gateway 61 in FIG. 6 has a connection, e.g. a USB connection, for a COTS input device 4, as well as a corresponding output for connection with the unsafe displaying PC 1 (not shown in FIG. 6), via which the relative coordinates are forwarded to the PC 1 in order to control a GUI or operate the PC 1. In parallel, the gateway 61 supplies the relative coordinates to the SMU 21, in particular for the purpose of showing the cursor 5, as described above. The gateway 61 has an input for the confirmation device or CD 14 and, among other things, provides a logically safe channel between the confirmation device 14 and the SMU 21. Furthermore, the gateway 61 provides an interface for safety-aimed communication via a safe industrial bus, e.g., PROFINET or as per the PROFIsafe protocol, in particular for the purpose of transmitting safety-aimed commands or information generated by the SMU 21 itself, e.g., based on a confirmation entry at the CD 14, or even safety-aimed commands, for example.

In addition to the safe input function according to the invention, the SMU 21 can also implement a safe display according to the concept in WO 2011/003872 A1, and/or safe input using an absolute input device, e.g., a capacitive touch device according to EP 2 551 787 B1. For the sake of brevity, the teachings in both the latter and the former documents are fully incorporated herein.

The invention claimed is:

1. A method for a safety-relevant input on a graphical user interface, wherein a computer generates image data for a display and comprises an input device for controlling the user interface, wherein the method includes:
   transmitting computer-generated image data from the computer to the display via an image data line;
   displaying a user interface on the display with at least one graphical control element that is selectable in a user-controlled manner using the input device; and
   wherein a monitoring unit is connected to the image data line and, for a safety function, reads out at least portions of the image data; wherein
      the monitoring unit is supplied with input information coming from the input device and depending on which user-controlled selection of the control element is recognizable by the monitoring unit;
      the monitoring unit is connected to a confirmation device for receiving a user-controlled confirmation via a safe signal path,
      the monitoring unit ensures and/or verifies that a recognized selection of the control element is correctly represented in the image data supplied to the display; and
      the monitoring unit, upon receipt of a user-controlled confirmation during a displayed selection of the control element, releases or triggers a safety-relevant control command associated with the control element, in particular outputs the control command via a safe signal path.

2. The method according to claim 1, wherein the monitoring unit ensures that a recognized selection of the control element is correctly represented in the image data supplied to the display, in that the monitoring unit modifies at least a portion of the image data intended for display in a predetermined image area that is associated with the control element, and the monitoring unit correspondingly forwards modified image data to the display;
   wherein the modified image data preferably represent a pointer dependent on the input information; and/or
   wherein the modified image data preferably cause a visual highlighting of the selection for the user, in particular in the predetermined image area on the display; and/or modified image data preferably superimpose computer-generated image data in certain areas.

3. The method according to claim 1, wherein computer-generated image data represent a selection of the control element, and the monitoring unit verifies that recognized selection of the control element is correctly represented in the image data supplied to the display, in that, regarding image data intended for display in a predetermined image area associated with the control element, the monitoring unit calculates a check code and compares this check code with at least one prestored reference code.

4. The method according to claim 1, wherein input information is transmitted from the input device to the displaying computer via the monitoring unit, or is transmitted to the monitoring unit via the displaying computer.

5. The method according to claim 2, wherein
   the monitoring unit comprises a first computing component, to which the computer-generated image data are supplied on the input side and which, depending on a selection of the safety-critical control element, modifies this image data so as to visually highlight the selection, and forwards image data for the display on the output side, and
   the monitoring unit comprises a second computing component, which is used to verify output-side image data of the first computing component.

6. The method according to claim 5, wherein the first computing component, regarding computer-generated image data intended for display in the predetermined image area, calculates a first-level check code, and the monitoring unit compares this first-level check code with at least one prestored reference code for the predetermined image area, wherein the first computing component, preferably on the input side in a first step, calculates first-level check codes regarding computer-generated image data and, in a second step subsequent thereto, modifies image data.

7. The method according to to claim 6, wherein
   the first computing component calculates a first second-level check code regarding image data modified by the first computing component which are intended for display in the predetermined image area,
   the second computing component calculates a second second-level check code regarding image data on the output side of the first computing component which are intended for display in the predetermined image area,
   the monitoring unit compares the second-level check codes with one another, in particular for the purpose of verifying that the selection is highlighted by the first computing component as intended; and
   preferably both computing components each calculate a third check code regarding image data of the predetermined image area without selection, which the monitoring unit compares with one another for the purpose of verifying display of the control element as intended; and/or
   the computing component(s) calculate(s) check codes only when a control element selection is recognized, in particular regarding image data for a predetermined image area associated with the control element.

8. The method according to claim 5, wherein the first computing component modifies the image data for visual highlighting of the selection such that the selected control element is displayed in a selected second state which is visually distinguishable from a non-selected first displaying state, for example by showing a frame, changing the color, or the like, and/or the first computing component outputs or forwards modified image data in an image data stream together with computer-generated image data for the display.

9. The method according to claim 1, wherein, in order to control the user interface, a pointer, in particular a mouse pointer, is shown on the display, characterized in that
   the pointer is generated exclusively by the monitoring unit by means of image data modification in the monitoring unit, in particular made possible on the basis of the input information which is supplied to the monitoring unit, wherein the input device, in particular a computer mouse, is preferably connected directly to the monitoring unit and forwards this input information to the displaying computer; or the pointer is generated outside of all predetermined image areas by the displaying computer and, if a selection of a safety-critical control element is recognized by the monitoring unit in the respectively associated image area, preferably by means of image data modification in the monitoring unit, no computer-generated pointer will be displayed, wherein the input device, in particular a computer mouse, is preferably connected directly to the displaying computer and the latter forwards input information to the monitoring unit; and/or for in each case N successive image cycles of the image data, the mouse pointer is only displayed for a number m<N of image cycles by the computer or the monitoring unit;

and/or the input information represents absolute coordinate information or relative coordinate information.

10. A monitoring unit for monitoring a graphical user interface, in particular according to a method according to claim 1, comprising:

a digital image data interface for connection to an image data line for the transmission of computer-generated image data from a computer to a display, in particular an LVDS interface, an HDMI interface, or the like;

at least one computing component which implements a safety function and reads out at least portions of the image data via the image data interface;

a device interface for input information, in particular based on an input device, in particular a pointing device, for the user-controlled selection of a graphical control element; wherein the monitoring unit comprises a physical confirmation input for a safe confirmation device, and the at least one computing component is configured to ensure and/or verify that a recognized selection of the control element is correctly represented in image data supplied to the display; and the monitoring unit is configured to output, upon receipt of a confirmation input via the confirmation interface during a displayed selection of the control element, an associated safety-relevant control command, in particular via a safety interface.

11. The monitoring unit according to claim 10, wherein the at least one computing component is configured for image data modification and/or for calculating check codes from the image data;

the monitoring unit comprises at least one memory for specifying predetermined image areas and/or reference codes, and/or the monitoring unit comprises a controller component for an input device, which controller component is connected to the device interface for the direct connection of an input device, in particular a computer mouse, to the monitoring unit, wherein the monitoring unit preferably comprises a data interface, in particular a bidirectional data interface, for transmitting input information to a computer.

12. The monitoring unit according to claim 10, wherein the monitoring unit ensures that a recognized selection of the control element is correctly represented in the image data supplied to the display, in that the monitoring unit modifies at least a portion of the image data intended for display in a predetermined image area that is associated with the control element, and the monitoring unit correspondingly forwards modified image data to the display;

the modified image data preferably represent a pointer dependent on the input information; and/or the modified image data preferably cause a visual highlighting of the selection for the user, in particular in the predetermined image area on the display; and/or modified image data preferably superimpose computer-generated image data in certain areas, and wherein the monitoring unit comprises a two-stage, in a particular two-channel, computer architecture having:

a first computing component which is configured to receive computer-generated image data on the input side and, depending on a safety function, to modify at least a portion of the image data intended for display in a predetermined image area, and to provide image data on the output side for a display, and having a second computing component which is configured to verify image data provided by the first computing component, by calculating a check code for image data which are intended to be displayed in the predetermined image area, and that the monitoring unit is configured to compare calculated check codes with at least one prestored reference code, in particular for the purpose of verifying highlighting by the first computing component as intended, and/or for the purpose of initiating a safety-aimed response.

13. The monitoring unit according to claim 12, wherein the first computing component is, regarding computer-generated image data which are intended for display in a monitoring area, configured to calculate a check code for a safety-aimed comparison with at least one prestored reference value for the monitoring area, wherein the first computing component initially calculates check codes on the input side for computer-generated image data and, in a second step subsequent thereto, modifies image data, wherein the first and second computing components are implemented by means of two separate integrated circuits, e.g., FPGA, ASIC, or the like, in particular of varying design.

14. The monitoring unit according to claim 12, wherein the at least one computing component having a safety function, in particular the first and second computing components, computationally generate(s) respective check codes regarding selected image areas, and a voter arrangement is connected to the computing component(s) in order to compare the generated check codes with prestored reference data.

15. The monitoring unit according to claim 14, wherein the voter arrangement is implemented as a two-channel processor circuit, preferably as a 2oo2 voter.

16. The monitoring unit according to claim 15, wherein the second computing component is configured to receive image data on the input side and, dependent on a safety function, to redundantly modify at least a portion of the image data in a manner identical as the first computing component, and the first computing component is configured so as to calculate a first check code regarding the modified image data, and the second computing component is configured so as to calculate a second check code regarding the redundantly modified image data, wherein the monitoring unit, in particular the voter arrangement, compares the first and the second check codes.

17. The monitoring unit according to claim 10, wherein a module for safety-aimed communication via a bus interface in the form of a safety interface for the output of safety-relevant control commands is connected to the monitoring unit or is integrated into it.

18. The monitoring unit according to claim 10, wherein the monitoring unit is configured to perform at least one of the following:
- the monitoring unit ensures that a recognized selection of the control element is correctly represented in the image data supplied to the display, in that the monitoring unit modifies at least a portion of the image data intended for display in a predetermined image area that is associated with the control element, and the monitoring unit correspondingly forwards modified image data to the display;
- the modified image data preferably represent a pointer dependent on the input information; and/or
- the modified image data preferably cause a visual highlighting of the selection for the user, in particular in the predetermined image area on the display; and/or
- modified image data preferably superimpose computer-generated image data in certain areas.

19. A system for a safety-relevant input on a graphical user interface, comprising a computer and, connected thereto via an image data line, a display for pixel graphics, characterized by a monitoring unit according to claim 10 that is physically separated from the computer, wherein
- an input device, in particular a computer mouse, for operating a user interface is connected directly to the device interface of the monitoring unit; and
- a separate safe confirmation device, in particular a safety button, is connected to the physical confirmation input of the monitoring unit.

20. A display device for displaying pixel graphics, in particular having a TFT panel, characterized by a monitoring unit according to claim 10 integrated into the device, as well as at least one connection for an input device connected to the device interface of the monitoring unit, and a connection for a safe confirmation device connected to the confirmation input of the monitoring unit.

* * * * *